US 12,405,345 B2

(12) United States Patent
Singh et al.

(10) Patent No.: US 12,405,345 B2
(45) Date of Patent: Sep. 2, 2025

(54) INDOOR POSITIONING WITH FINE TIME MEASUREMENT

(71) Applicant: QUALCOMM Incorporated, San Diego, CA (US)

(72) Inventors: Govind Singh, Hyderabad (IN); Sudhanshu Singh, Hyderabad (IN); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 696 days.

(21) Appl. No.: 17/451,565

(22) Filed: Oct. 20, 2021

(65) Prior Publication Data

US 2023/0123087 A1 Apr. 20, 2023

(51) Int. Cl.
| | |
|---|---|
| *G01S 1/02* | (2010.01) |
| *G01C 21/20* | (2006.01) |
| *G01S 5/02* | (2010.01) |
| *G01S 5/00* | (2006.01) |

(52) U.S. Cl.
CPC .......... *G01S 5/0236* (2013.01); *G01C 21/206* (2013.01); *G01S 5/01* (2020.05)

(58) Field of Classification Search
CPC ...... G01S 5/0236; G01S 5/01; G01S 2201/01; G01S 2201/02; G01S 2205/01; G01S 2205/02; G01S 2201/00; G01C 21/206
USPC ......................................................... 342/385
See application file for complete search history.

(56) References Cited

U.S. PATENT DOCUMENTS

| | | | | | |
|---|---|---|---|---|---|
| 9,332,511 | B2 * | 5/2016 | Hole | ................. | H04W 56/0005 |
| 9,907,047 | B1 * | 2/2018 | Vamaraju | ................ | H04W 4/23 |
| 10,034,188 | B2 * | 7/2018 | Ben-Haim | ............ | H04L 43/106 |
| 10,805,898 | B2 * | 10/2020 | Wang | ..................... | H04B 7/063 |
| 11,039,306 | B2 * | 6/2021 | Li | ............................ | G01S 7/006 |
| 11,129,126 | B2 * | 9/2021 | Wang | .................. | H04B 7/0695 |
| 11,510,172 | B1 * | 11/2022 | Feng | ......................... | G01S 5/14 |
| 2011/0025562 | A1 | 2/2011 | Hol et al. | | |
| 2016/0363648 | A1 * | 12/2016 | Mindell | .................. | G01S 7/003 |
| 2018/0063809 | A1 * | 3/2018 | Vamaraju | .............. | H04W 24/10 |

(Continued)

FOREIGN PATENT DOCUMENTS

| | | | | | |
|---|---|---|---|---|---|
| CN | 108027432 | A * | 5/2018 | ........... | G01S 13/825 |
| CN | 113170278 | A * | 7/2021 | ........... | G01S 1/0428 |

(Continued)

OTHER PUBLICATIONS

Hordos B., et al., "Calculator Converts to a µC I/O keypad/display", Electrical Design News, vol. 22, No. 3, Feb. 5, 1977, pp. 97-101, XP001609421, figure 1.

(Continued)

*Primary Examiner* — Chuong P Nguyen
(74) *Attorney, Agent, or Firm* — Muncy, Geissler, Olds & Lowe, P.C.

(57) ABSTRACT

Disclosed are techniques for wireless communication. In an aspect, a first station (STA) may receive a first packet from a second STA at a first time-of-arrival of the first packet. The first STA may activate a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof.

72 Claims, 16 Drawing Sheets

(56) References Cited

U.S. PATENT DOCUMENTS

2019/0098493 A1* 3/2019 Li .................. H04L 63/068
2021/0315042 A1* 10/2021 Ouzieli ............ H04W 12/0433

FOREIGN PATENT DOCUMENTS

WO   WO-2017026758 A1 * 2/2017 .......... G01C 21/206
WO      2018026317 A1    2/2018
WO   WO-2023009938 A1 * 2/2023 .......... G01S 5/0205

OTHER PUBLICATIONS

International Search Report and Written Opinion—PCT/US2022/076998—ISA/EPO—Dec. 19, 2022.
Yu Y., et al., "A Robust Dead Reckoning Algorithm Based on Wi-Fi FTM and Multiple Sensors", Remote Sensing, vol. 11, No. 5, Mar. 1, 2019, p. 504, XP093005221, Section 4 on pp. 10-13 and Section 5, first paragraph, on p. 13, figures 1,6, 22 Pages.
Yu Y., et al., "Precise 3-D Indoor Localization Based on Wi-Fi FTM and Built-In Sensors", IEEE Internet of Things Journal, IEEE, USA, vol. 7, No. 12, Jun. 3, 2020, pp. 11753-11765, XP011825654, abstract Section IV. Integrated Localization Based on UPF, Particularly Paragraph B.Integrated Localization Based on Wi-Fi FTM and Built-In Sensors, figures 1,2,4.

* cited by examiner

INDOOR POSITIONING WITH FINE TIME MEASUREMENT

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high-speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth-generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

Wi-Fi is another form of wireless communication system. A Wi-Fi network may act in a standalone capacity or may integrate with another wireless network type for positioning operations. Wi-Fi is a family of wireless network protocols, based on the IEEE 802.11 family of standards, which are commonly used for local area networking of devices and Internet access, allowing nearby digital devices to exchange data by radio waves. Wi-Fi networks are some of the most widely used computer networks in the world, used globally in home and small office networks to link desktop and laptop computers, tablet computers, smartphones, smart TVs, printers, and smart speakers together. Such devices can be linked to a wireless router to connect them to the Internet.

Wi-Fi uses multiple parts of the IEEE 802 protocol family and is designed to interwork seamlessly with its wired sibling Ethernet. Compatible devices can network through wireless access points to each other as well as to wired devices and the Internet. The different versions of Wi-Fi are specified by various IEEE 802.11 protocol standards, with the different radio technologies determining radio bands, and the maximum ranges, and speeds that may be achieved. Wi-Fi most commonly uses the 2.4 gigahertz (120 mm) UHF and 5 gigahertz (60 mm) SHF radio bands; these bands are subdivided into multiple channels. Channels can be shared between networks but only one transmitter can locally transmit on a channel at any moment in time.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a first station (STA) includes receiving a first packet from a second STA at a first time-of-arrival of the first packet; and activating a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof.

In an aspect, a method of wireless communication performed by a first station (STA) includes transmitting a first packet at a first time-of-departure; and activating a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof.

In an aspect, a first station (STA) includes a memory; at least one transceiver; and at least one processor communicatively coupled to the memory and the at least one transceiver, the at least one processor configured to: receive, via the at least one transceiver, a first packet from a second STA at a first time-of-arrival of the first packet; and activate a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof.

In an aspect, a first STA includes a memory; at least one transceiver; and at least one processor communicatively coupled to the memory and the at least one transceiver, the at least one processor configured to: transmit, via the at least one transceiver, a first packet at a first time-of-departure; and activate a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof.

In an aspect, a first station (STA) includes means for receiving a first packet from a second STA at a first time-of-arrival of the first packet; and means for activating a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof.

In an aspect, a first STA includes means for transmitting a first packet at a first time-of-departure; and means for activating a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof.

In an aspect, a non-transitory computer-readable medium stores computer-executable instructions that, when executed by a first station (STA), cause the first STA to: receive a first packet from a second STA at a first time-of-arrival of the first packet; and activate a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof.

In an aspect, a non-transitory computer-readable medium stores computer-executable instructions that, when executed by a first STA, cause the first STA to: transmit a first packet at a first time-of-departure; and activate a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
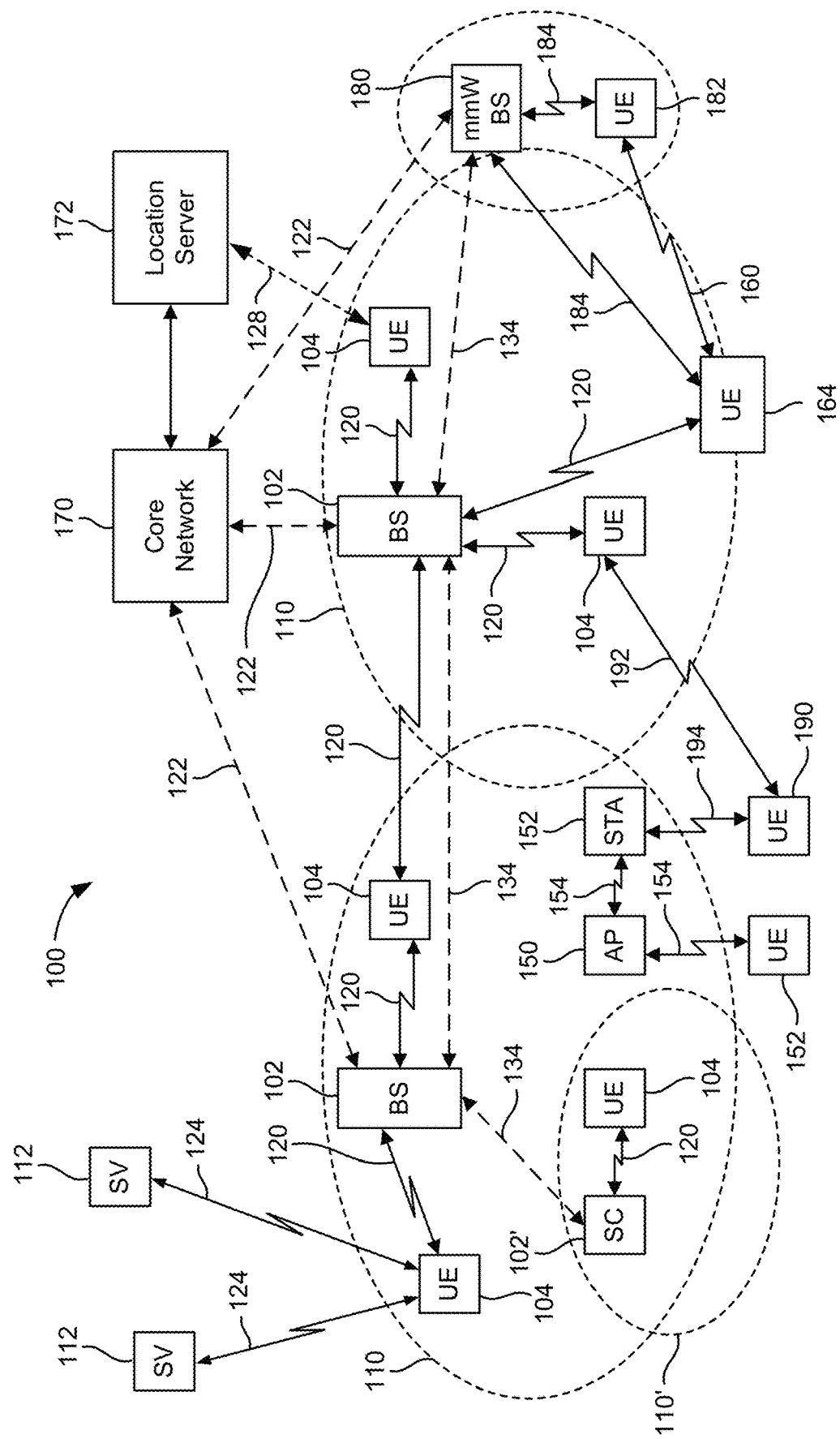
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next-generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example, an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (WiFi-D), Bluetooth®, and so on.

Figure 2A:
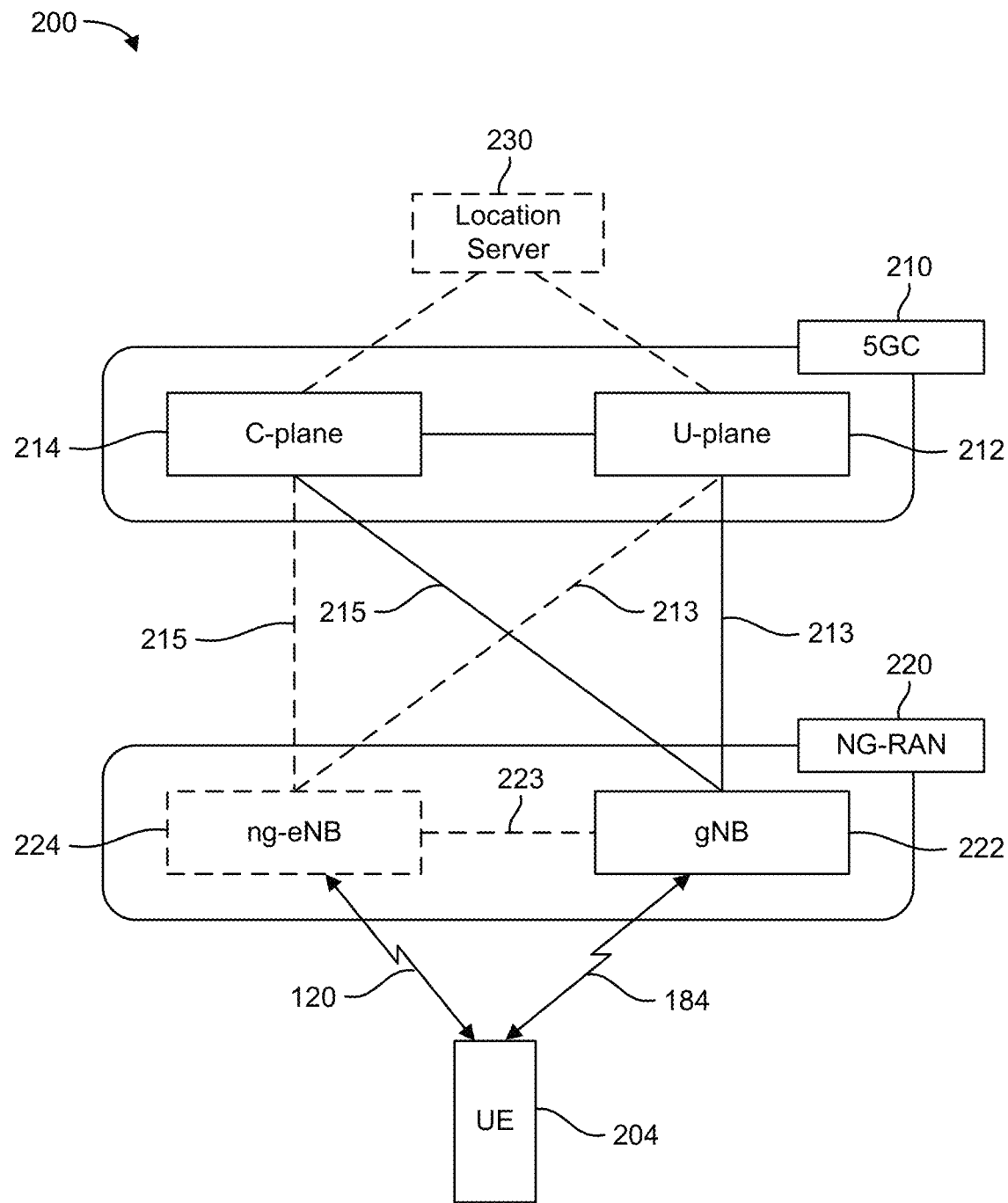
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third-party server, such as an original equipment manufacturer (OEM) server or service server).

Figure 2B:
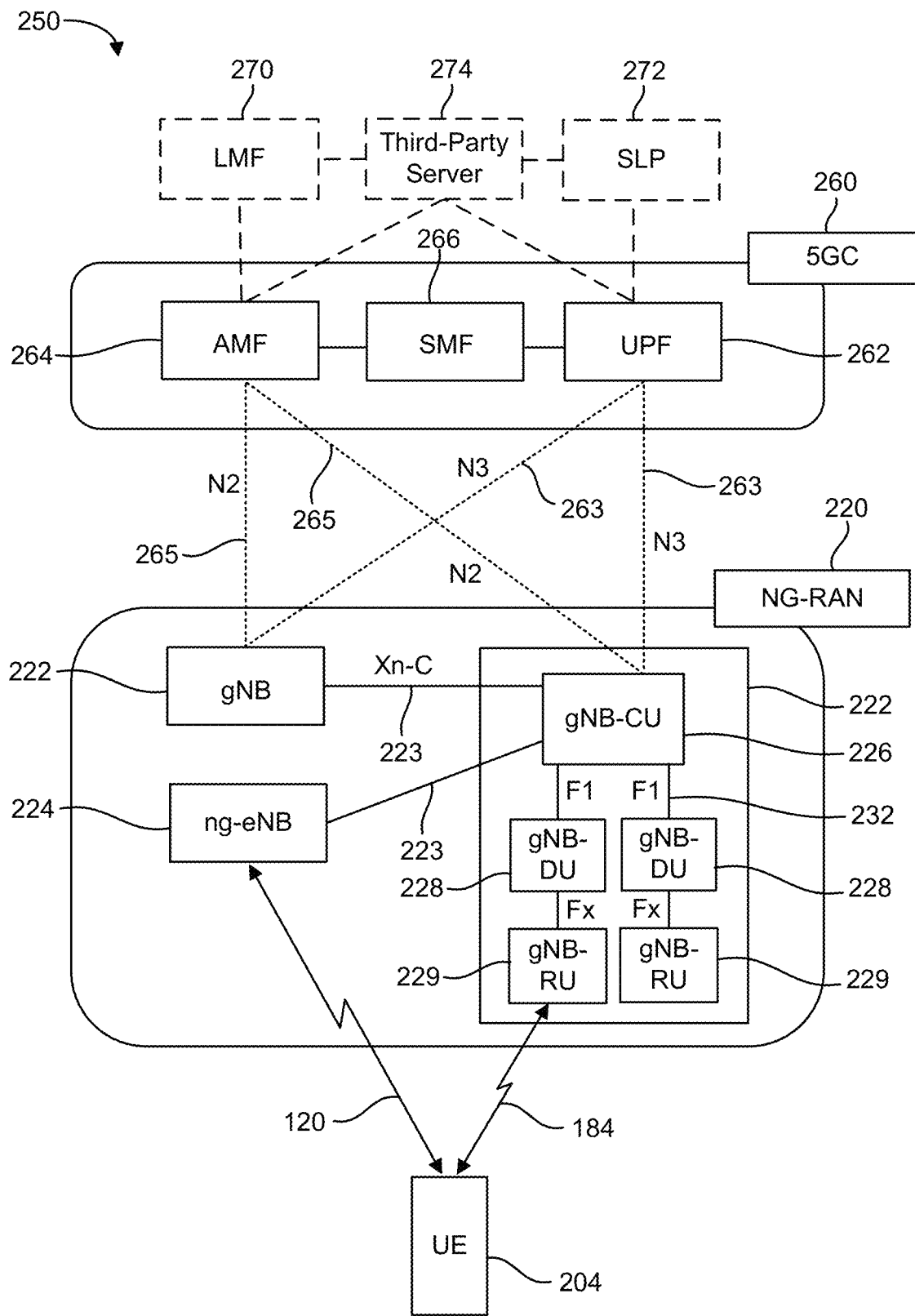

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
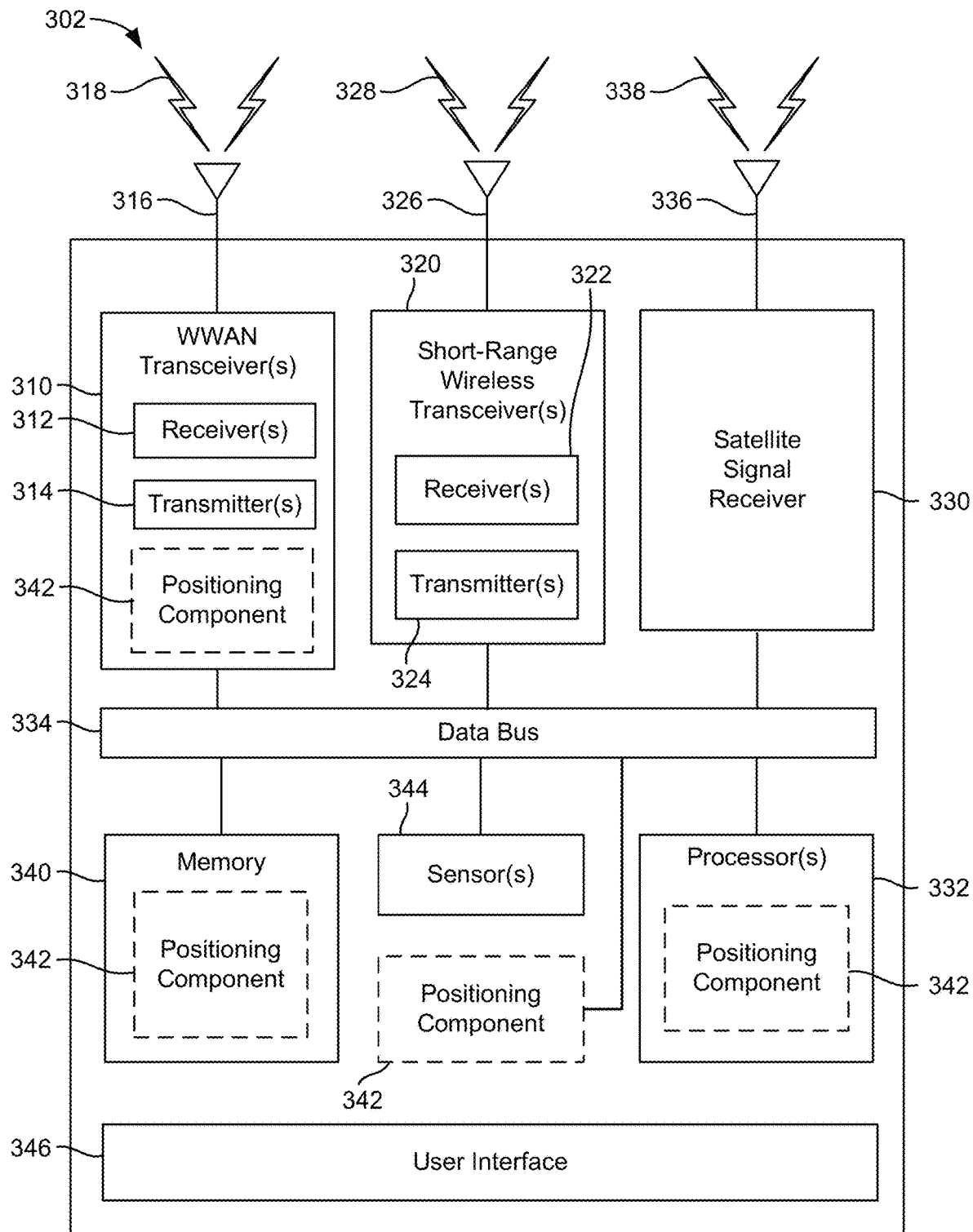
FIGS. 3A, 3B, and 3C are simplified block diagrams of several sample aspects of components that may be employed in a user equipment (UE), a base station, and a network entity, respectively, and configured to support communications as taught herein.
Figure 3B:
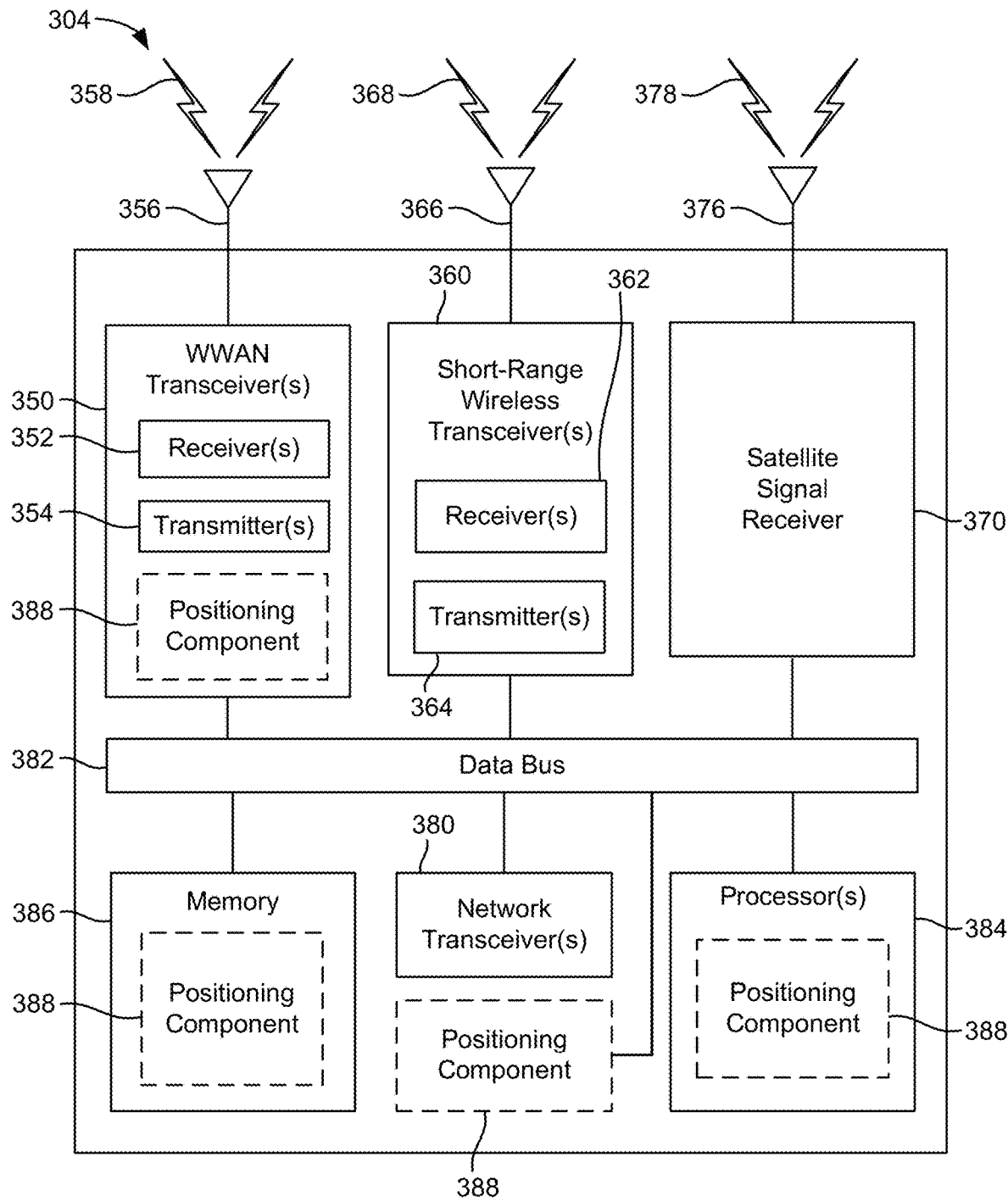
Figure 3C:
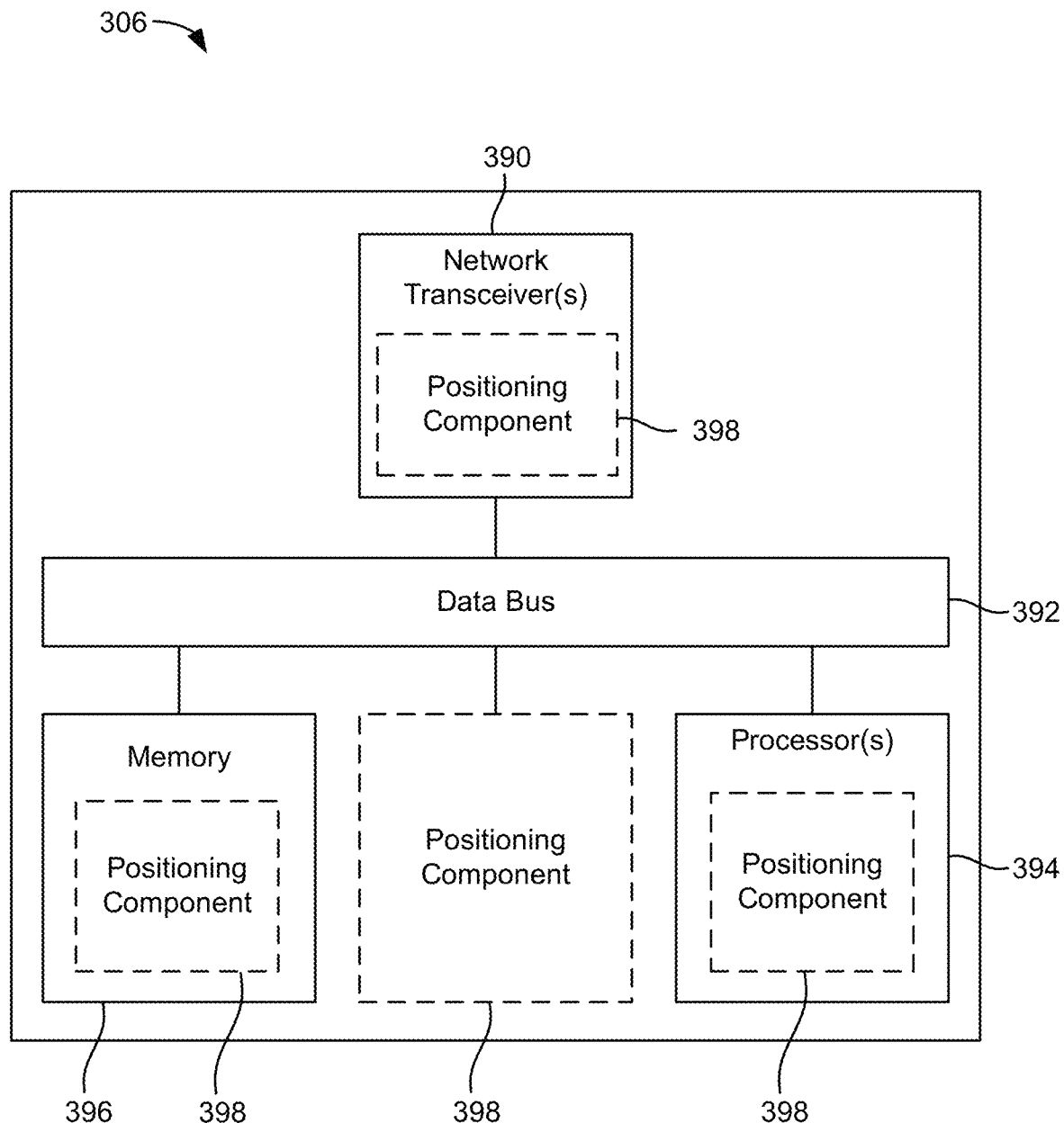

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Positioning environments, such as indoor positioning environments, may include multiple stations (STAs) of various types of transceiver devices such as, for example, mobile devices (e.g., smart phones, notebook computers, tablet computers, etc.) and wireless access devices (e.g., wireless local area network (WLAN) access point, personal area network (PAN), or femto cell). There are different types of positioning protocols that may be used in such environments to enable effective and efficient measurements of ranges between the STAs in the positioning environment. Certain positioning protocols include message flows, message frames, and message fields that facilitate measurement of round-trip time (RTT) or time of flight (TOF) of signals transmitted by the STAs. Such measurements allow for a determination of ranges between the STAs. Using fewer messages, for example. Such a measured range may be used in any one of several applications including positioning operations, for example.

Figure 4:
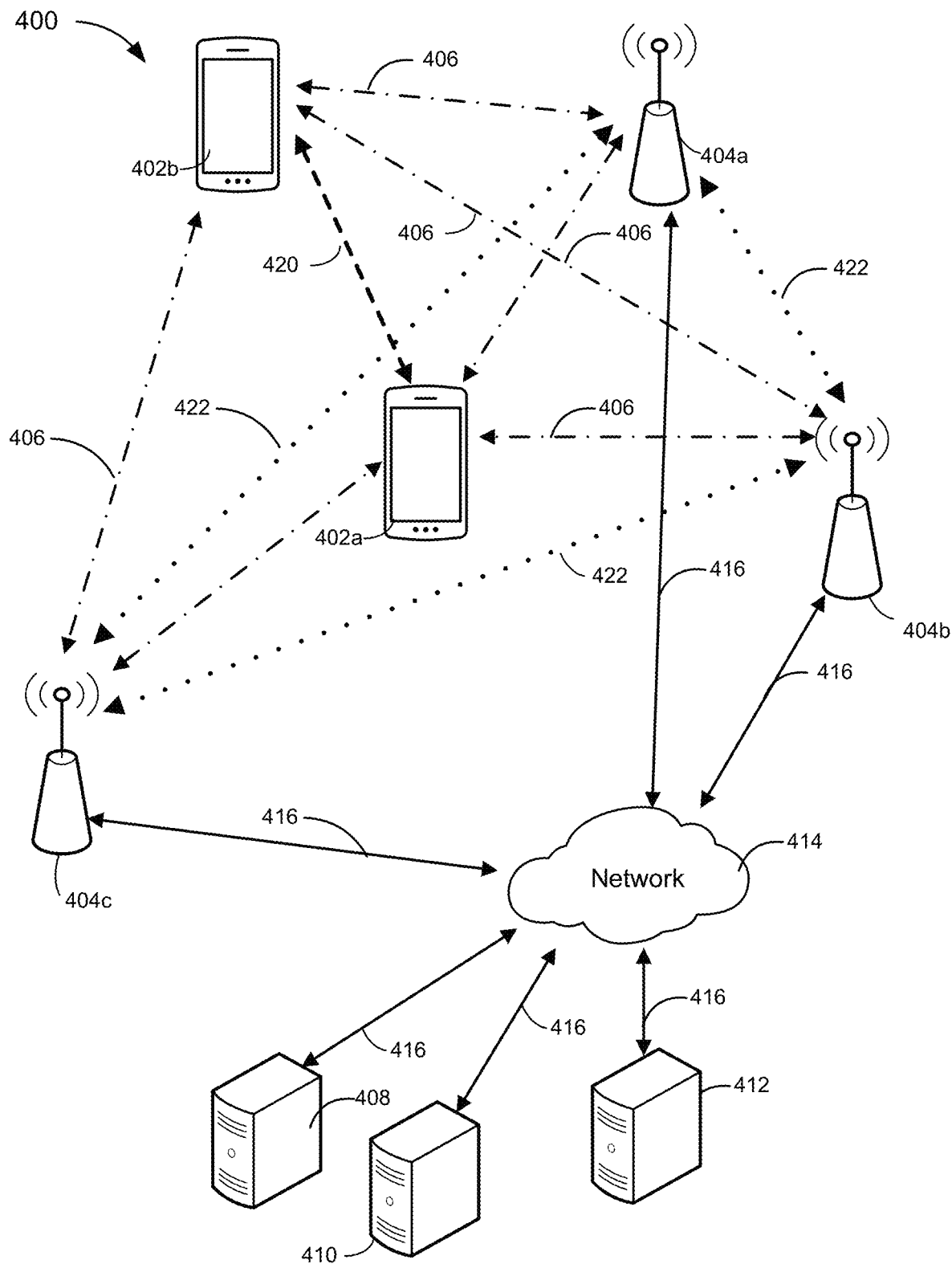
FIG. 4 shows an example positioning environment in which positioning protocols may be implemented in accordance with certain aspects of the present disclosure.

FIG. 4 shows an example positioning environment 400 in which positioning protocols may be implemented in accordance with certain aspects of the present disclosure. In FIG. 4, the example positioning environment 400 (e.g., an indoor environment) includes multiple mobile devices 402a, 402b and multiple local transceivers 404a, 404b, and 404c. The local transceivers 404 may provide access to a wireless local area network (WLAN, e.g., IEEE Std. 802.11 network) or wireless personal area network (WPAN, e.g., Bluetooth network). In another example implementation, one or more of the local transceivers 404 may be implemented as a femto cell transceiver capable of facilitating communication on wireless communication link 406 according to a cellular communication protocol. Based on the teachings of the present disclosure, it will be recognized that various aspects of the disclosure may be used a wide range of positioning environments having more or fewer and/or devices of different types. FIG. 4 is presented as a non-limiting example.

In the example positioning environment 400, local transceivers 404 may communicate with one or more servers 408, 410, and/or 412 over a network 414 along communication links 416. In accordance with certain aspects of the disclosure, network 414 may include any combination of wired or wireless communication links. For example, network 414 may comprise Internet Protocol (IP) infrastructure capable of facilitating communication between mobile devices 402 and servers 408, 410, or 412 through one or more of the local transceivers 404. In another implementation, network 414 may comprise wired or wireless communication network infrastructure to facilitate mobile cellular communication with mobile devices 402.

In accordance with certain aspects of the disclosure, one or more of the mobile devices 402 are capable of computing a position fix based, at least in part, on signals acquired from the local transceivers 404. In accordance with certain aspects of the disclosure, mobile devices 402 may obtain a position fix by measuring ranges to three or more indoor of the local transceivers 404 (e.g., wireless access points) which are positioned at known locations in the positioning environment 400. In accordance with certain aspects of the disclosure, a mobile device or 402 or a local transceiver 404 may receive positioning assistance data for indoor positioning operations from servers 408, 410, or 412. Such positioning assistance data may include the identities of the local transceivers 404 and their known locations to enable one or more of the mobile devices 402 to determine its range with respect to the local transceivers 404 based, at least in part, on TOF measurements.

As described herein, various positioning protocols define an exchange of messages between wireless STAs to obtain measurements of RTT transmissions between the STAs. Such an exchange of messages may take place between a mobile device and a stationary transceiver (e.g., between mobile device 402 and a local transceiver 404 over a wireless link 406), between peer mobile devices (e.g., between mobile devices 402a and 402b over wireless link 420), or between stationary transceivers (e.g., between local transceivers 404a, 404b, and 404c over wireless communication links 422). In accordance with certain aspects of the disclosure, the various positioning protocols described herein may incorporate some aspects or features of IEEE Standard 802.11-2016 and/or IEE Standard 802.11ax (collectively "IEEE Standard 802.11"), which are available to the public.

Figure 5:
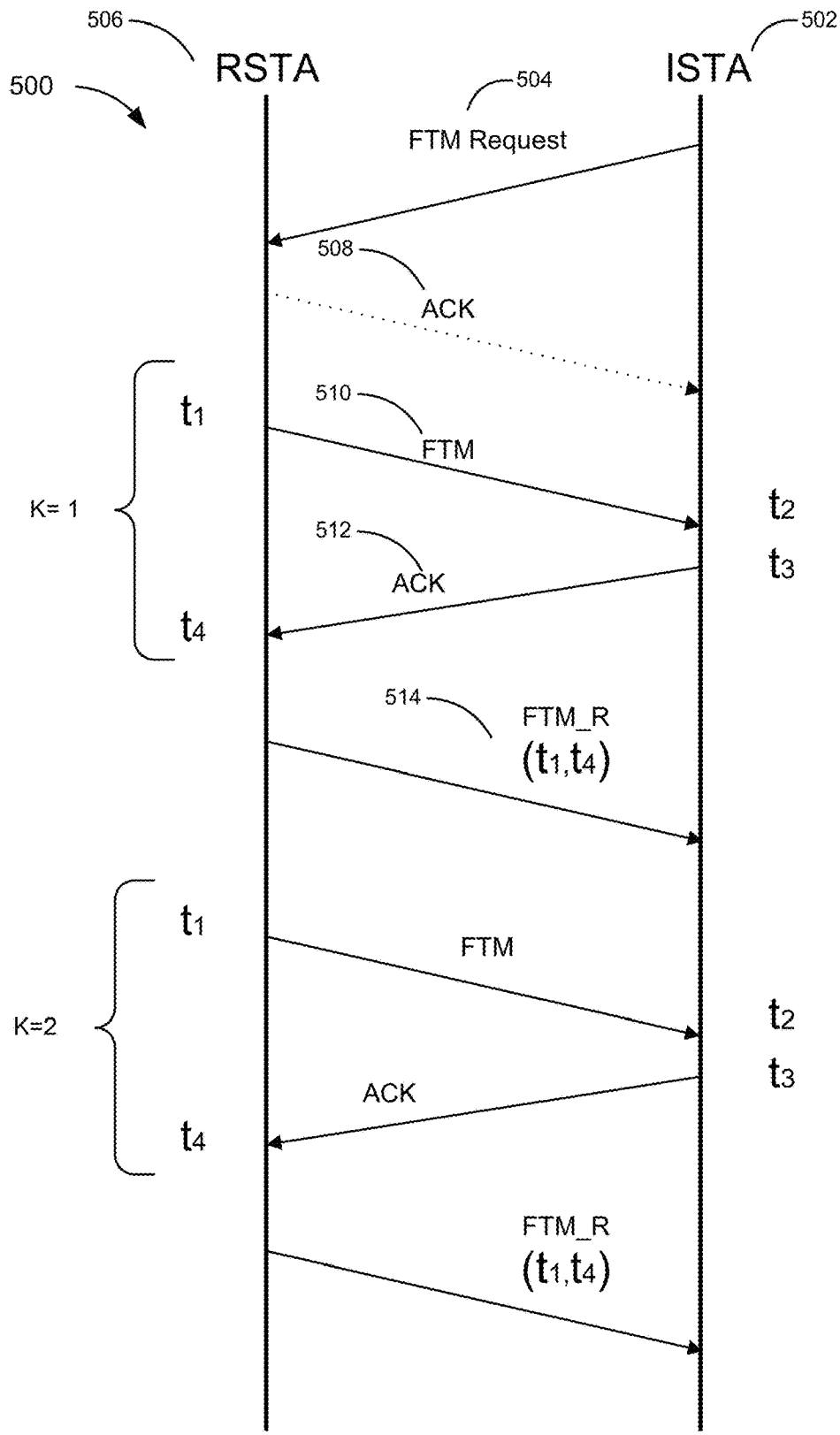
FIG. 5 is a diagram of an example message exchange in a fine timing measurement protocol in accordance with certain aspects of the disclosure.

One such positioning protocol is known as a fine time measurement protocol. An example of the fine timing measurement protocol is described in connection with the message flow 500 shown in FIG. 5. The example message flow 500 shown in FIG. 5 is an exchange of messages between wireless stations STAs including an "initiator" STA (ISTA) 502 and a "responding" STA (RSTA) 506. In this context, ISTA 502 or RSTA 506 may comprise any one of several transceiver devices including a mobile device (e.g., mobile device 402) or stationary access transceiver device (e.g., local transceiver 404). The ISTA 502 may obtain or compute one or more RTT measurements based, at least in part, on the timing of messages or frames transmitted between the ISTA 502 and RSTA 506. As used herein, the terms "message" and "frame" are used interchangeably. In this example, ISTA 502 may transmit a fine timing measurement request message or frame 504 to RSTA 506 and, in certain aspects, receive an optional fine timing request message acknowledgment message or frame (ACK) 508 transmitted by the RSTA 506 in response. In accordance with certain aspects of the disclosure, the contents of the fine timing measurement request message 504 may be as shown in the IEEE std. 802.11. In certain aspects, the ACK frame 508 may merely provide an indication of receipt of a previously transmitted message.

The exchange of messages that are measured begins with the transmission of an FTM frame 510 by the RSTA 506. The RSTA 506 records a timestamp $t_1$ corresponding to the time at which a specified portion (e.g., preamble) of the FTM frame 510 is transmitted (e.g., time-of-departure) from an antenna of the RSTA. The ISTA 502 receives the FTM frame 510 and records a timestamp $t_2$ corresponding to the time at which the specified portion (e.g., preamble) is received (e.g., time-of-arrival) at an antenna of the ISTA. In response to reception of the FTM frame 510, the ISTA 502 transmits an ACK frame 512 and records a timestamp $t_3$ corresponding to the time at which a specified portion of the ACK frame 512 is transmitted at the antenna of the ISTA 502. The RSTA 506 receives the ACK frame 512 and records a timestamp $t_4$ corresponding to the time at which the specified portion of the ACK frame 512 is received at the antenna of the RSTA 506. In certain aspects, the RSTA 506 sends an FTM report (FTM_R) frame 514 to the ISTA 502 that includes the timestamp values $t_1$ and $t_4$ recorded by the RSTA 506. Using the timestamp values $t_1$, $t_2$, $t_3$, and $t_4$, the ISTA 502 may determine the RTT measurement (e.g., RTT= $(t_4-t_1)-(t_3-t_2)$ for the message exchange with the RSTA 506. In turn, the RTT measurement may be used by the ISTA 502 in determining the range between the ISTA 502 and RSTA 506.

In accordance with certain aspects of the disclosure, the message exchange may be repeated multiple times, n, to obtain additional timestamp values ($t_1$, $t_2$, $t_3$, and $t_4$) for each round trip, K. Such multiple repetitions of the message exchange may be used to improve the measurement accuracy, where the RTT is determined by an average of, n, round trips and expressed as:

$$RTT = \frac{1}{n}\left(\sum_{K=1}^{n} t_4(K) - \sum_{K=1}^{n} t_1(K)\right) - \frac{1}{n}\left(\sum_{K=1}^{n} t_3(K) - \sum_{K=1}^{n} t_4(K)\right)$$

Then, the range (e.g., distance), d, between the ISTA 502 and the RSTA 506 can be calculated as d=RTT·c/2, where c, is the speed of electromagnetic wave propagation. The initiator and responder clocks do not need to be synchronized as time differences between readings taken by the same clock are subsumed in the calculation.

Figure 6:
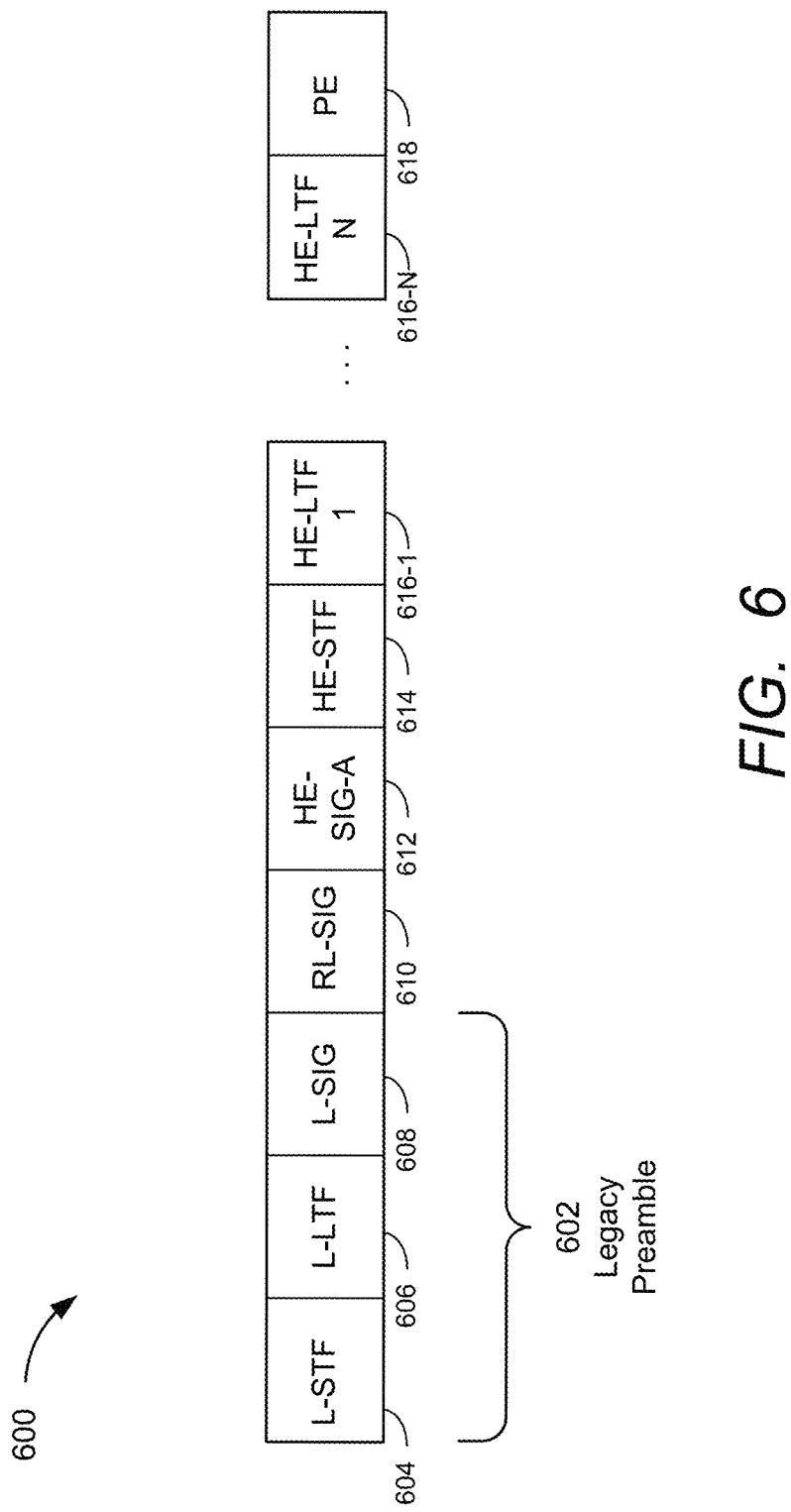
FIG. 6 is a diagram of an example null data packet (NDP) in accordance with certain aspects of the disclosure.

Another positioning protocol for use in determining a distance between STAs uses an exchange of null-data-packets (NDP) to determine TOF and/or RTT measurements. FIG. 6 is a diagram of an example NDP 600 that generally corresponds to an NDP defined by the IEEE 802.11ax (HE) Standard. The NDP 600 includes a legacy portion 404 having a legacy short training field (L-STF) 604, a legacy long training field (L-LTF) 606, and a legacy signal field (L-SIG) 608.

The L-STF 604 includes a signal (e.g., a training signal) that is configured to permit an STA to perform one or more functions such as i) packet detection, ii) initial synchronization, and iii) automatic gain control (AGC) adjustment. In an aspect, the L-LTF 606 includes a signal (e.g., a training signal) that is configured to permit the STA to perform one or more functions such as i) channel estimation and ii) fine synchronization. The contents of the L-STF 604 and the L-LTF 606 are defined by a communication protocol and are the same for every packet.

The L-SIG 608 includes physical layer information, such as i) a rate subfield, and ii) a length subfield. Contents of the rate subfield and the length subfield are set to indicate a duration of NDP 600 so that legacy communication devices are able to at least determine a duration of the NDP 600.

The NDP 600 also includes another instance of the L-SIG 608, referred to as a repeated L-SIG (RL-SIG) 610. The NDP 600 also includes a high-efficiency Wi-Fi signal field (HE-SIG-A) 612 that generally carries information about a format of the NDP 600 within subfields, such as a subfield that specifies the number of spatial streams via which the NDP 600 is transmitted, a subfield that specifies a bandwidth of the NDP 600, a subfield that specifies i) a duration of training fields in the NDP 600 and ii) a duration of a guard interval (GI) included with each of the training fields, etc.

A high-efficiency Wi-Fi short training field (HE-STF) 614 includes a signal that is configured to permit the STA to perform a function such as AGC refinement. High-efficiency Wi-Fi long training fields (HE-LTFs) 616 include signals that are configured to permit the STA to perform a function such as a channel estimation for a MIMO channel that employs multiple spatial streams. In an aspect, a number (N) of HE-LTFs 616 in the NDP 600 corresponds to a number of spatial streams (specified in HE-SIG-A 612) via which the NDP 600 is transmitted. In an aspect, a duration of each of the HE-LTFs 616 and a guard interval duration used with each of the HE-LTFs 616 is specified in HE-SIG-A 612.

Each NDP 600 includes one or more signals that may be used as a basis for determining a time at which an STA receives the NDP 600 and the time at which the STA transmits the NDP 600. In certain aspects, training signals, such as HE-LTFs 616, may be used to determine times of receipt (e.g., time-of-arrival) of an NDP during a ranging measurement procedure. In certain aspects, the time of transmission (e.g., time-of-departure) of an NDP may be determined with reference to the transmission of training signals, such as HE-LTFs 616, during a ranging measurement procedure. Generally, if a time-of-departure is determined with respect to a particular signal transmitted from an STA, the time-of-arrival is determined with respect to the same particular training signal received at another STA. In an aspect, the time-of-arrival corresponds to the time at which the particular training signal is received at an antenna of an STA, and the time-of-departure corresponds to the time at which the particular training signal is transmitted from the antenna of an STA.

In an aspect, the NDP 600 optionally includes a packet extension field (PE) 618 that includes arbitrary information that need not be processed by a receiver device. The PE 618 provides a receiver device with additional time to process the HE-LTFs 616 prior to transmitting a subsequent packet a defined time period (e.g., a short interframe space (SIFS)) after an end of reception of the NDP 600. For example, in a ranging measurement exchange such as discussed with reference to FIG. 7 below, an STA may transmit a packet a defined time period (e.g., SIFS) after an end of reception of an NDP, such as an NDPA frame, a ranging feedback frame, another NDP, etc.

Each of the L-STF 604, the L-LTF 606, the L-SIG 608, the RL-SIG 610, the HE-SIG-A 612, the VHT-STF 614, and the N VHT-LTFs 616, and the PE 618 comprises one or more orthogonal frequency division multiplexing (OFDM) symbols. As merely an illustrative example, the HE-SIG-A 612 comprises two OFDM symbols.

In the illustration of FIG. 6, the NDP 600 includes one of each of the L-STF 604, the L-LTF 606, the L-SIG 608, the RL-SIG 610, and the HE-SIG-A 612. When an NDP 600 spans a cumulative bandwidth that includes multiple subchannels (e.g., multiple 20 MHz subchannels), each of the L-STF 604, the L-LTF 606, the L-SIG 608, the RL-SIG 610, and the HE-SIG-A 612 is repeated over a corresponding number of subchannels (e.g., 20 MHz subchannels) of the whole bandwidth of the packet, in an aspect. For example, in an aspect in which the NDP 600 occupies an 80 MHz bandwidth, NDP 600 includes four of each of the L-STF 604, the L-LTF 606, the L-SIG 608, the RL-SIG 610, and the HE-SIG-A 612. The HE-STF 614 and the HE-LTFs 616 are generated to span the entire cumulative bandwidth of the NDP 600.

Figure 7:
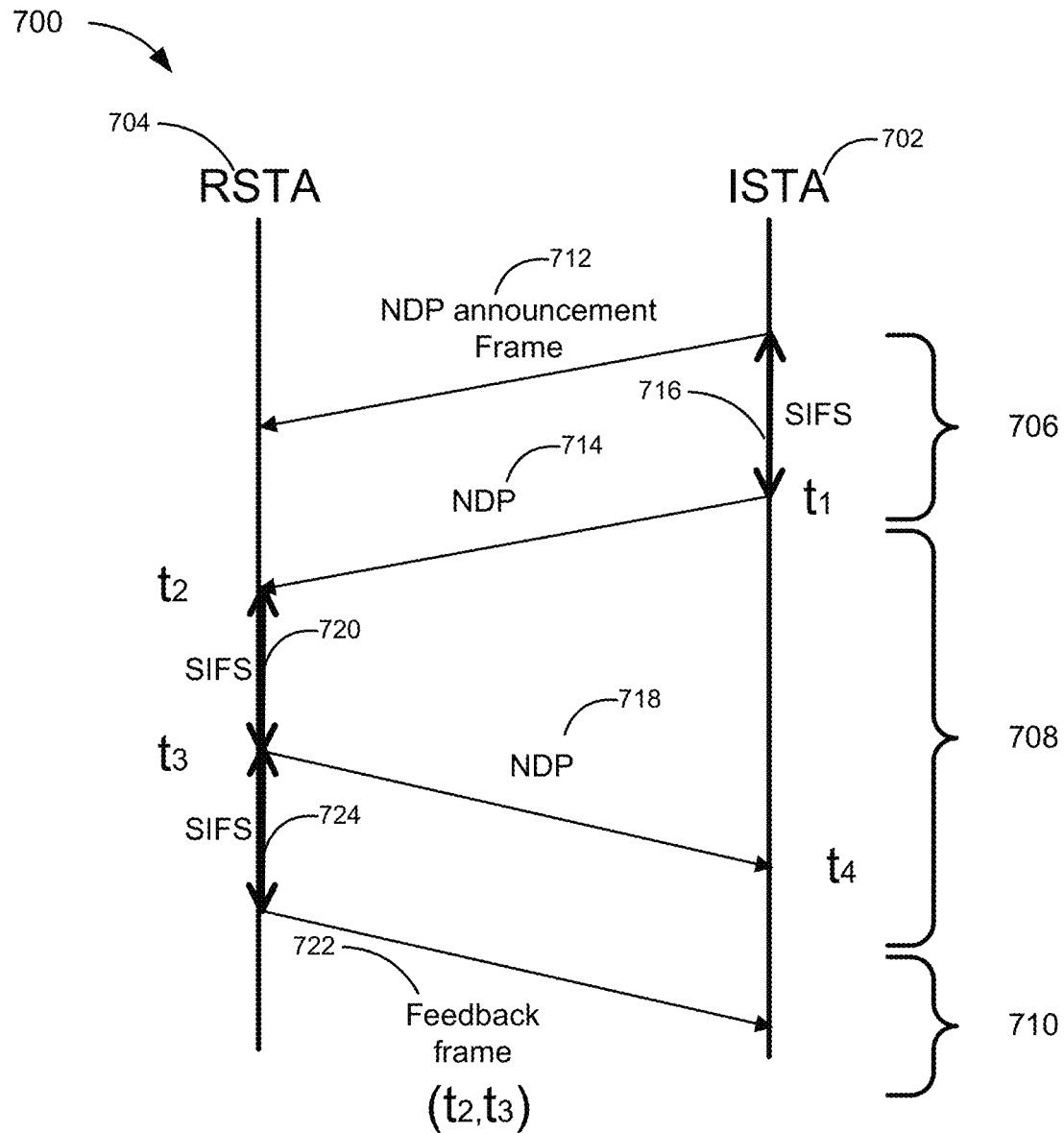
FIG. 7 is a diagram of an example message exchange in a ranging measurement procedure using NDPs in accordance with certain aspects of the disclosure.

FIG. 7 is a diagram of an example message exchange 700 in a ranging measurement procedure using NDPs in accordance with certain aspects of the IEEE Standard 802.11ax. The example shown in FIG. 7 is a non-triggered, single-user (SU) procedure. However, in accordance with certain aspects of the disclosure, the procedures may be extended to multiple-user (MU) environments and/or triggered ranging procedures such as those shown in IEEE Standard 802.11ax.

The message exchange 700 is shown in the context of a ranging procedure between an ISTA 702 and an RSTA 704. The message exchange 700 includes an NDP exchange portion 706, an NDP transmission portion 708, and a feedback frame exchange portion 710. In another aspect, the message exchange 700 may also include an additional, optional feedback frame exchange (e.g., feedback from the ISTA 702 to the RSTA 704) which is not shown in FIG. 7.

In the NDP exchange portion 706, the ISTA 702 transmits a physical layer protocol data unit (PPDU) that includes an NDP announcement frame 712. The NDPA frame 712 is configured to cause the RSTA 704 to be prepared to receive an NDP from the ISTA 702 as part of a ranging measurement procedure. In certain aspects, the NDPA frame 712 in the PPDU includes parameters for the RSTA 704 to use when participating in the ranging message exchange 700. The NDPA frame 712 for ranging measurements may be in the form of the NDP 600 shown in FIG. 6.

The ISTA 702 generates a PPDU having at least one NDP 714 and begins transmitting the PPDU with the NDP 714 a defined time period 716 after an end of the preceding PPDU with the NDP announcement frame 712. In an aspect, the defined time period is a short interframe space (SIFS). In certain aspects, another suitable time period may be utilized.

The NDP 714 includes a preamble having one or more STFs, one or more LTFs, and one or more signal fields such as those shown in FIG. 6. In an aspect, the preamble of the NDP 714 includes i) a legacy portion having an L-STF, an L-LTF, and an L-SIG, and ii) a non-legacy portion having an HE-STF, one or more HE-LTFs, and one or more HE-SIGs. In certain aspects, multiple NDPs 714 are transmitted in the PPDU, the different NDPs 714 being transmitted in different frequency bandwidth portions. In certain aspects in which multiple NDPs 714 are transmitted, two or more of the NDPs 714 are transmitted within the same frequency band (e.g., two or more of the NDPs 714 span the same frequency band) using different spatial streams (e.g., the two or more NDPs 714 are transmitted using MU-MIMO).

In the example shown in FIG. 7, the NDP 714 is a ranging NDP having a format such as the one shown and described in FIG. 6, which includes signals that are particular to a ranging measurement procedure. As such, the NDP 714 has a format that is different than NDPs that are used for purposes other than ranging measurements, and/or includes signals that are different than NDPs that are used for purposes other than ranging measurements such as NDPs used in connection with performing channel measurements, NDPs used in connection with performing beamforming measurements, etc.

When transmitting the NDP 714, the ISTA 702 records a timestamp $t_1$ corresponding to the time at which the first communication device began transmitting a particular portion of the NDP 714 (e.g., a particular HE-LTF in the NDP 714) at an antenna of the ISTA 702. Similarly, when the RSTA 704 receives the NDP 714, the RSTA 704 records a timestamp $t_2$ corresponding to the time at which the RSTA 704 began receiving the particular portion of the NDP 714 (e.g., the particular HE-LTF in the NDP 714) and an antenna of the RSTA 704.

Responsive to receiving the NDP 714, the RSTA 704 begins transmitting a PPDU including an NDP 718 at a defined time period SIFS 720 after the NDP 714 has been received at the RSTA 704. When transmitting the NDP 718, the RSTA 704 records a timestamp $t_3$ corresponding to the time at which the RSTA 704 began transmitting a particular portion of the NDP 718 (e.g., a particular HE-LTF in the NDP 718) from its antenna. Similarly, when the ISTA 702 receives the NDP 718, the ISTA 702 records a timestamp $t_4$ corresponding to the time at which the ISTA 702 began receiving the particular portion of the NDP 718 (e.g., the particular HE-LTF in the NDP 718) at its antenna.

The FB frame exchange portion 710 includes a PPDU having a feedback (FB) frame 722. In certain aspects, the PPDU, including the FB frame 722, is transmitted a defined time period SIFS 724 after the PPDU, including NDP 718, has been transmitted. The FB frame 722 includes the recorded timestamps $t_2$ and $t_3$. In certain aspects, the FB frame 722 may optionally include channel estimate information determined by the RSTA 704 based on the reception of the NDP 714.

After receipt of the FB frame 722, the ISTA 702 determines an RTT measurement between the ISTA 702 and the RSTA 704 using the recorded times $t_1$, $t_2$, $t_3$, and $t_4$. Any suitable technique may be utilized to determine the RTT measurement using the recorded times $t_1$, $t_2$, $t_3$, and $t_4$. The distance between the ISTA 702 and the RSTA 704 may be calculated as $d=RTT \cdot c/2$, where c, is the speed of electromagnetic wave propagation.

In certain aspects, the ISTA 702 determines an estimated position of the ISTA 702 and/or an estimated position of the RSTA 704 using the measured RTT. In an aspect, the ISTA 702 may use a triangulation technique to calculate the estimated positions.

Figure 8A:
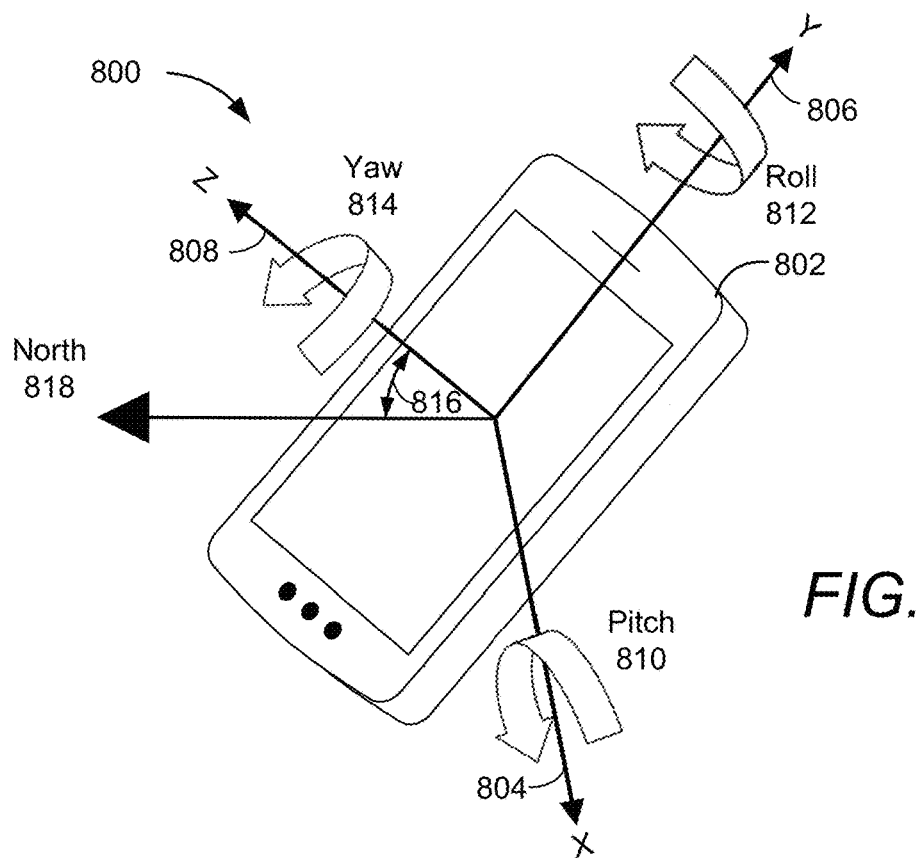
FIG. 8A is a diagram of a mobile device showing an example of a reference body frame in accordance with certain aspects of the disclosure.

Many mobile devices include sensor subsystems that include multiple sensors to provide motion and orientation information for the mobile device. Certain aspects of the disclosure are implemented with a recognition that such motion and orientation information may be used to supplement the ranging determinations described herein to provide a more accurate determination of the position of the mobile device. In an aspect, pedestrian dead reckoning (PDR) may be used to determine the motion, orientation, and heading of a mobile device. In PDR, and other techniques of monitoring motion, heading, and orientation of a mobile device involve a navigation frame and a body frame. The navigation frame is defined as an absolute reference frame, and the body frame is defined with the screen of the phone and its default orientation. FIG. 8A is a diagram 800 of a mobile device 802 showing one such body frame in accordance with certain aspects of the disclosure. The body frame in this example uses a right-hand Cartesian coordinate system having an x-axis 804, y-axis 806, and z-axis 808. A coordinate transformation with Euler angles for pitch 810, roll 812, and yaw 814 indicate the rotation around the x-axis 804, y-axis 806, and z-axis 808, respectively, may be performed to describe how a vector is converted from the navigation frame to the body frame. FIG. 8A also shows an azimuth 816 orientation of the mobile device 802 corresponding to the angle between the mobile device's current compass direction (e.g., along the z-axis 808) and magnetic north 818.

Heading estimation may also be used in PDR and other motion and orientation techniques. In general, mobile devices can obtain an absolute direction from magnetometers as well as a relative direction from gyroscopes. In indoor environments, magnetometers may experience a bias. Compensation for the bias of the magnetometer in the case of indoor measurements may be accomplished using a known adaptive tilt technique. The tilt refers to the angle between the horizontal plane of the navigation frame and the screen plane of the mobile device when gripped naturally by the operator.

Figure 8B:
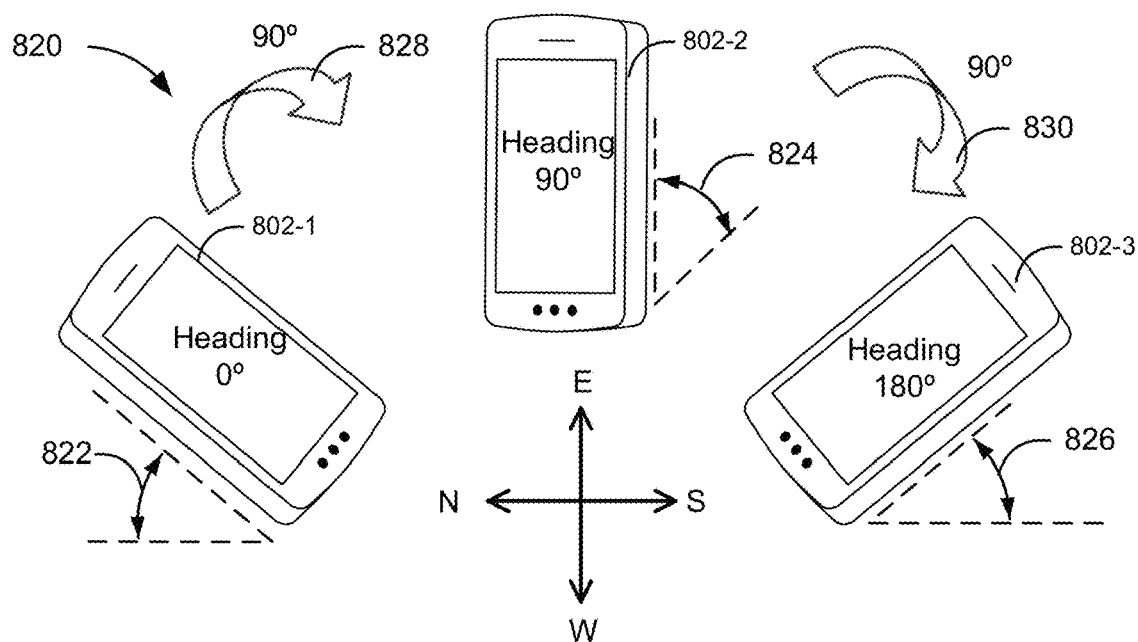
FIG. 8B is a diagram showing an example of the orientation of a mobile device and resulting heading estimation when using an adaptive tilt technique in accordance with certain aspects of the disclosure.

FIG. 8B is a diagram 820 showing the orientation of a mobile device 802 and the resulting heading. Estimation when using an adaptive tilt technique. Mobile device 802-1 is at an angle 822 between the horizontal plane of the navigation frame and the screen plane of the mobile device, giving an estimated heading of 0°. When rotated 90°, as shown by arrow 828, the mobile device 802-2 is at an angle 824 between the horizontal plane of the navigation frame and the screen plane of the mobile device, giving an estimated heading of 90°. When rotated an additional 90°, as shown by arrow 830, the mobile device 802-3 is at an angle 826 between the horizontal plane of the navigation frame and the screen plane of the mobile device, giving an estimated heading of 180°. Angles, other than those shown in FIG. 8B, give rise to other estimated heading values. The sensors of the mobile device 802 may be processed using techniques other than adaptive tilt to obtain an estimated heading, the adaptive tilt technique being merely one such heading estimation technique.

In accordance with certain aspects of the disclosure, the data from the sensor subsystem may be used to supplement the ranging estimates determined using Wi-Fi RTT measurements. Certain aspects of the disclosure recognize that pitch/roll/yaw/heading information obtained from the sensor subsystem in existing techniques are generated independently of the Wi-Fi RTT measurements. In such existing techniques, the raw sensor data is completely processed to obtain processed values for the motion and orientation of the mobile device before it is used, if at all, with the Wi-Fi RTT measurements. As such, the sensor information provided by the sensor subsystem is not synchronized with the Wi-Fi RTT measurements and may lead to an invalid correlation of the distance determined from the Wi-Fi RTT measurements, and the motion and orientation determinations provided by the sensor subsystem.

Figure 9:
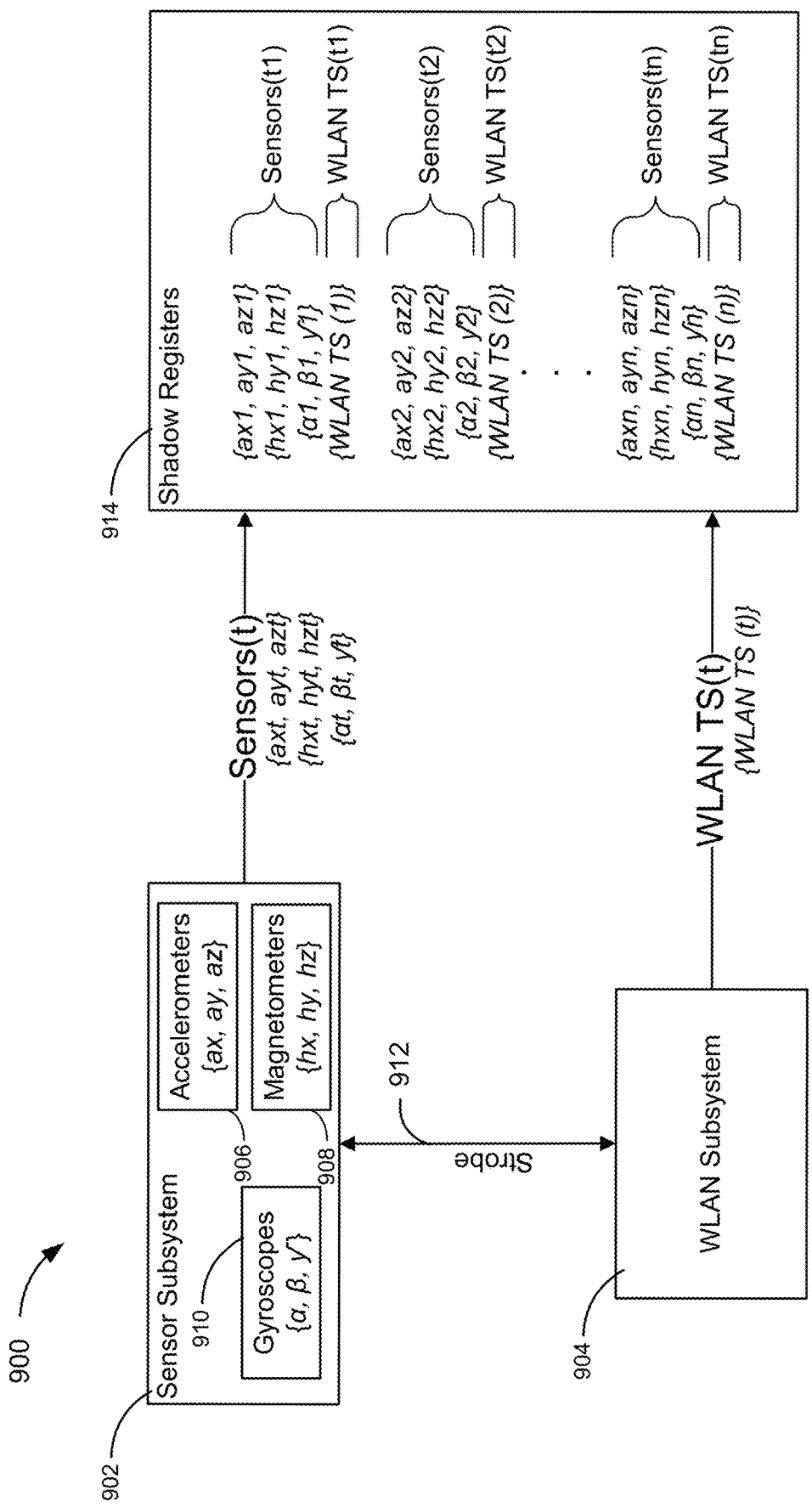
FIG. 9 is a block diagram of an example system for synchronizing sensor subsystem data with timing measurements in accordance with certain aspects of the disclosure.

In accordance with certain aspects of the disclosure, Wi-Fi RTT measurements are synchronized with the data obtained from the sensor subsystem so that there is a direct correlation between the sensor data output and the timing measurements that are obtained to determine the Wi-Fi RTT. FIG. 9 is a block diagram of a system 900 for synchronizing sensor subsystem data with timing measurements in accordance with certain aspects of the disclosure.

The example system 900 shown in FIG. 9 includes a sensor subsystem 902 and a WLAN subsystem 904. The sensor subsystem 902 includes a plurality of sensors providing data outputs that may be used to determine the orientation, motion, and heading of the corresponding mobile device. Here, the sensor subsystem 902 includes a plurality of accelerometers 906 configured to provide data corresponding to the acceleration ax of the mobile device along the x-axis, the acceleration ay of the mobile device along the y-axis, and the acceleration az of the mobile device along the z-axis.

The sensor subsystem 902 of the example system 900 also includes a plurality of magnetometer sensors 908. In an aspect, the magnetometer sensors 908 are configured to provide data corresponding to the magnetic field hx along the x-access of the mobile device, the magnetic field by along the y-axis of the mobile device, and the magnetic field hz along the z-axis of the mobile device.

The sensor subsystem 902 of the example system 900 further includes a plurality of gyroscope sensors 910. In an aspect, the gyroscope sensors 910 are configured to provide data corresponding to the pitch $\alpha$, roll $\beta$, and yaw $\gamma$ orientations of the mobile device.

During Wi-Fi RTT ranging, the WLAN subsystem 904 detects the times-of-arrival and times-of-departure of ranging packets. The WLAN subsystem provides WLAN Timestamps (TS) at each such time. In accordance with certain aspects of the disclosure, the WLAN subsystem 904 is configured to generate a strobe signal 912 at each time-of-arrival and time-of-departure of the ranging packets. In an aspect, the strobe signal 912 is provided to the sensor subsystem 902 to capture the data present at the output of the accelerometers 906, magnetometer sensors 908, and gyroscopes 910 as the data exists at the corresponding time-of-arrival and time-of-departure. The captured sensor data is correlated with the WLAN TSs corresponding to the times-of-arrival and times-of-departure of the ranging packets to generally synchronize the sensor data with the time measurements used in the ranging operations.

In accordance with certain aspects of the disclosure, the WLAN subsystem 904 may generate the strobe signal 912 at a general-purpose input/output (GPIO) of a microcontroller, or other processor, used in the WLAN subsystem 904. In certain aspects, the strobe signal 912 generates an interrupt to the sensor subsystem 902 that invokes execution of an interrupt routine by a processor of the sensor subsystem 902. In accordance with the interrupt routine, the sensor subsystem 902 captures the raw sensor data {axt, ayr, azt}, {hxt, hyt, hzt}, and {αt, βt, γt} values existing at the time WLAN TS(t) at which the strobe signal 912 was generated. In accordance with certain aspects, the strobe signal 912 may activate firmware of the sensor subsystem 902 to capture the raw sensor data.

The sensor data captured at the time t, in turn, may be stored and correlated with the WLAN TS at time t to provide time-synchronized data between the sensor subsystem 902 and the Wi-Fi RTT time measurements obtained by the WLAN subsystem 904. The resulting correlated sensor data may be provided to an input of a positioning technique that fuses the Wi-Fi RTT time measurements and correlated sensor data to obtain more accurate positioning determinations than otherwise available if the sensor data were not correlated with the Wi-Fi RTT time measurements.

In accordance with certain aspects of the disclosure, the sensor data may be captured and stored in one or more shadow registers 914 of a microcontroller of the sensor subsystem 902. Shadow registers, such as shadow registers 914, are used by certain microcontrollers to implement quick storage operations in response to high-priority interrupts. In certain aspects, the strobe signal 912 may be generated by the WLAN subsystem 904 at a time t (e.g., a time-of-arrival and/or time-of-departure of a ranging packet) and used to invoke a high-priority interrupt at a microcontroller that quickly stores the raw sensor data {axt, ayr, azt}, {hxt, hyt, hzt}, {αt, βt, γt} present at time t in the shadow registers 914. In certain aspects, the WLAN TS for time t may be provided by the WLAN subsystem 904 and stored with the raw sensor data in the shadow registers 914. Additionally, or in the alternative, the raw sensor data may be retrieved from the shadow register 914 and correlated with the WLAN TS for storage in other memory (e.g., memory other than shadow registers 914), where the correlated data can be accessed for subsequent positioning and/or ranging processing.

FIG. 9 shows storage of raw sensor data in the shadow registers 914 at three points in time t1, t2, t3, each corresponding to a time-of-arrival and/or time-of-departure of a ranging packet as determined by WLAN subsystem 904. At time t1, the WLAN subsystem 904 generates a strobe signal 912 to the sensor subsystem 902, which invokes an interrupt that captures raw sensor data {ax1, ay1, az1}, {hx1, hy1, hz1}, {α1, β1, γ1} and stores the raw sensor data in shadow registers 914. In certain aspects, the WLAN subsystem 904 may provide a timestamp WLAN TS(1) corresponding to time t1 and store it in the shadow registers 914 along with the raw sensor data captured at time t1. Additionally, or in the alternative, the raw sensor data may be retrieved from the shadow register 914 and correlated with the WLAN TS(1) for storage in other memory (e.g., memory other than shadow registers 914) in a separate data correlation operation.

At time t2, the WLAN subsystem 904 again generates a strobe signal 912 to the sensor subsystem 902, which invokes an interrupt that captures raw sensor data {ax2, ay2, az2}, {hx2, hy2, hz2}, {α2, β2, γ2} and stores the raw sensor data in shadow registers 914. In certain aspects, the WLAN subsystem 904 may provide a timestamp WLAN TS(2) corresponding to time t2 and store it in the shadow registers 914 along with the raw sensor data captured at time t2. Additionally, or in the alternative, the raw sensor data may be retrieved from the shadow register 914 and correlated with the WLAN TS(2) in memory storage (e.g., memory other than shadow registers 914) in a separate data correlation operation. A similar process occurs with respect to time t3, where the raw sensor data {ax3, ay3, az3}, {hx3, hy3, hz3}, {α3, β3, γ3} at time t3 is captured and stored in shadow registers 914 for correlation with the timestamp WLAN TS(3) corresponding to time t3. In certain aspects, old raw sensor data (and WLAN TS, if stored in the shadow registers 914) may be moved to other memory and flushed from the shadow registers 914 to make room for new raw sensor data when needed. The foregoing strobe trigger mechanism assists in ensuring a high correlation between the WLAN TS and sensor data.

In various aspects, the raw sensor data may be subsequently processed to obtain vectors for the linear acceleration $A_r$, angular acceleration $M_r$, and magnetic heading H of the mobile device. As an example, the acceleration vector $A_r$ may be generated from the raw sensor data, where $A_r$=f({ax, ay, az}). The angular acceleration vector $M_r$ may be determined from the raw sensor data, where $M_r$=f($\alpha$, $\beta$, $\gamma$). The heading vector H may be generated from the raw sensor data, where $$H = \tan^{-1}\left(\frac{Hy}{Hx}\right),$$

Hy=f(hyn) is the magnetic vector along the y-axis, and Hx=f(hxn) is the magnetic vector along the x-axis.

Figure 10:
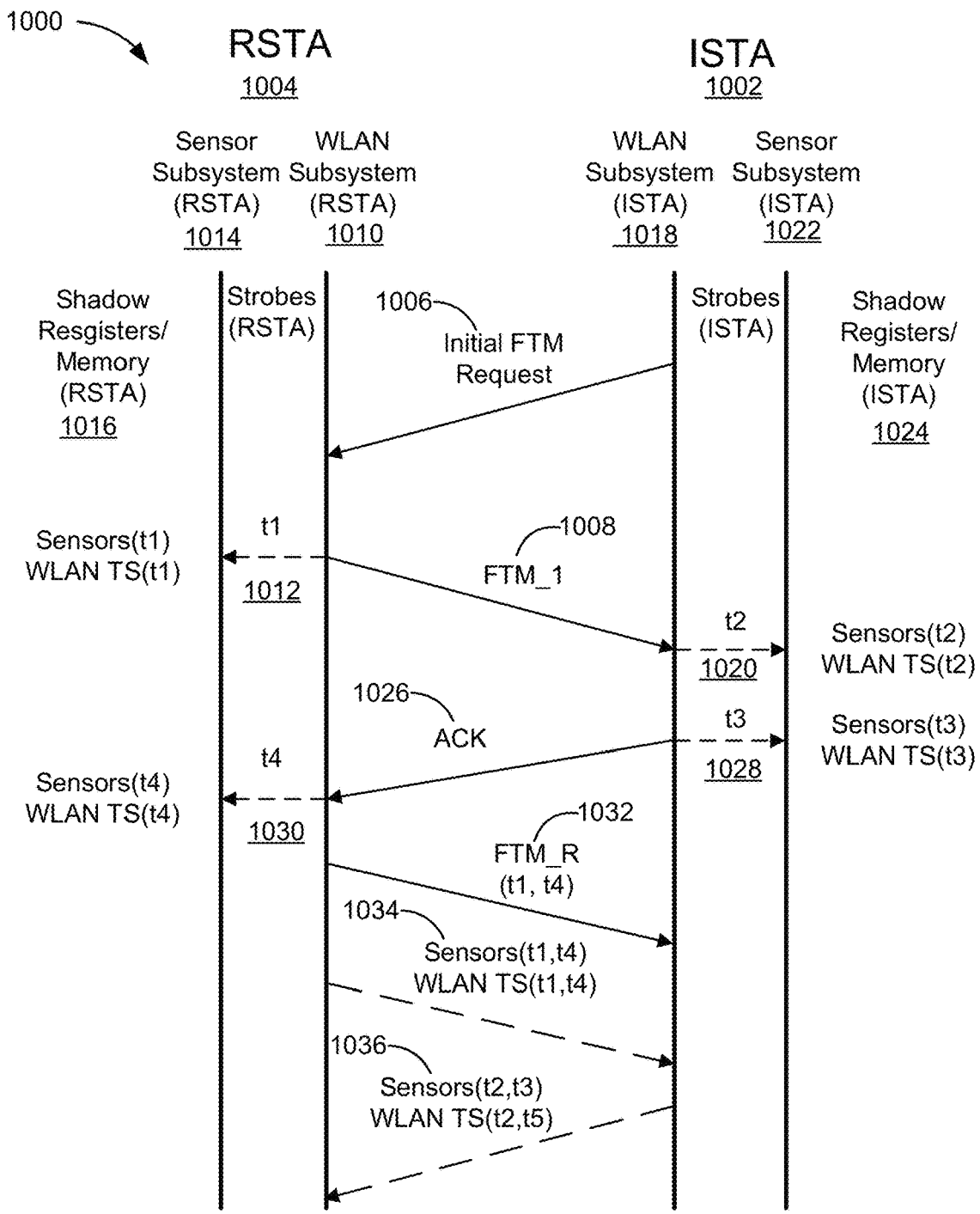
FIG. 10 is an example message flow showing synchronization between time measurement data and motion/heading/orientation sensor data when applied to a fine time measurement protocol in accordance with certain aspects of the disclosure.

The techniques for substantially synchronizing ranging data and corresponding motion/heading/orientation sensor data of a mobile device can be applied to various positioning protocols. FIG. 10 is an example message flow 1000 showing synchronization between time measurement data and motion/heading/orientation sensor data when applied to a fine time measurement protocol. The example message flow 1000 shown in FIG. 10 is an exchange of messages between an ISTA 1002 and an RSTA 1004. In this context, the ISTA 1002 or RSTA 1004 may comprise any one of several transceiver devices, including a mobile device or stationary access transceiver device. In this example, ISTA 1002 transmits a fine timing measurement request message or frame 1006 to RSTA 1004 and, in certain aspects, receives an optional fine timing request message acknowledgment message or frame (ACK) transmitted by the RSTA 1004 in response (not shown in FIG. 10).

The exchange of messages that are measured begins with the transmission of an FTM_1 frame 1008 by the RSTA 1004. A WLAN subsystem 1010 of RSTA 1004 generates a timestamp WLAN TS(t1) at $t_1$ corresponding to the time at which a specified portion (e.g., preamble) of the FTM_1 frame 1008 is transmitted (e.g., time-of-departure) from an antenna of the RSTA 1004. The WLAN subsystem 1010 also generates a strobe signal 1012 to a sensor subsystem 1014 of the RSTA 1004, which triggers the sensor subsystem 1014 to capture and store the output of its sensors (Sensors(t1)) in memory 1016 (e.g., shadow registers or other memory) of the RSTA 1004. Additionally, the timestamp WLAN(t1) is correlated with sensor data Sensors(t1) in the memory 1016.

The ISTA 1002 receives the FTM_1 frame 1008, and a WLAN subsystem 1018 of the ISTA 1002 generates a timestamp WLAN TS(t2) at $t_2$ corresponding to the time at which the specified portion (e.g., preamble) of FTM_1 1008 is received (e.g., time-of-arrival) at an antenna of the ISTA 1002. At time $t_2$, the WLAN subsystem 1018 also generates a strobe signal 1020 to a sensor subsystem 1022 of the ISTA 1002, which triggers the sensor subsystem 1022 to capture and store the output of its sensors (Sensors(t2)) in memory 1024 (e.g., shadow registers or other memory) of the ISTA 1002. Additionally, the timestamp WLAN(t2) is correlated with sensor data Sensors(t2) in the memory 1024.

In response to reception of the FTM_1 frame 1008, the ISTA 1002 transmits an ACK frame 1026, and the WLAN subsystem 1018 generates a timestamp WLAN TS(t3) at $t_3$ corresponding to the time at which a specified portion of the ACK frame 512 is transmitted at the antenna of the ISTA 502. At time $t_3$, the WLAN subsystem 1018 also generates a strobe signal 1028 to sensor subsystem 1022, which triggers the sensor subsystem 1022 to capture and store the output of its sensors (Sensors(t3)) in memory 1024. Additionally, the timestamp WLAN(t3) is correlated with sensor data Sensors(t3) in the memory 1024.

The RSTA 506 receives the ACK frame 512 and records a timestamp WLAN TS(t4) at $t_4$ corresponding to the time at which the specified portion of the ACK frame 1026 is received at the antenna of the RSTA 1004. At time $t_4$, the WLAN subsystem 1010 also generates a strobe signal 1030 to sensor subsystem 1014, which triggers the sensor subsystem 1014 to capture and store the output of its sensors (Sensors(t4)) in memory 1016. Additionally, the timestamp WLAN(t4) is correlated with sensor data Sensors(t4) in the memory 1016.

In certain aspects, the RSTA 1004 sends an FTM report (FTM_R) frame 1032 to the ISTA 1002 that includes the timestamp values WLAN TS(t1) and WLAN TS (t4) generated by the RSTA 506. Using the timestamp values WLAN TS(t1), WLAN TS(t2), WLAN TS(t3), WLAN TS(t4) corresponding to times $t_1$, $t_2$, $t_3$, and $t_4$, the ISTA 1002 may determine the RTT measurement (e.g., RTT=(WLAN TS(t4)–WLAN TS(t1))–(WLAN TS(t3)–WLAN TS(t3))= $(t_4-t_1)-(t_3-t_2)$ for the message exchange with the RSTA 1004. In turn, the RTT measurement may be used by the ISTA 1002 in determining the range between the ISTA 1002 and RSTA 1004. Further, ISTA 1002 may determine the motion/heading/orientation of ISTA 1002 using sensor measurements Sensors(t2) and Sensors(t3).

In accordance with certain aspects of the disclosure, the ISTA 1002 and RSTA 1004 may optionally exchange sensor data captured at the times $t_1$, $t_2$, $t_3$, $t_4$. To this end, RSTA 1004 may optionally transmit a sensor and timestamp frame 1034, including sensor data Sensors(t1,t4) and corresponding time stamps WLAN TS(t1,t4) to the ISTA 1002. The ISTA 1002 may determine the motion/heading/orientation of the RSTA 1004 using sensor measurements Sensors(t1,t4) to further refine positioning determinations. Additionally, or in the alternative, the ISTA 1002 may optionally transmit a sensor and timestamp frame 1036, including sensor data Sensors(t2,t3) and corresponding time stamps WLAN TS(t2, t3) to the RSTA 1004. The RSTA 1004 may determine the motion/heading/orientation of the RSTA 1004 using sensor measurements Sensors(t1,t4), the motion/heading/orientation of the ISTA 1002 using sensor measurements Sensors (t2,t3), and the time measurements WLAN TS(t1), WLAN TS(t2), WLAN TS(t3), and WLAN TS(t4) to accurately determine its own position. In accordance with certain aspects of the disclosure, the raw sensor data may be processed by the ISTA 1002 and/or RSTA 1004 to determine motion/heading/orientation values and send the determined motion/heading/orientation values instead of the raw sensor data during the exchange of frame 1034 and/or frame 1036. Before such an exchange of sensor data, the ISTA 1002 and RSTA 1004 may indicate whether each has the capability to capture such sensor data to one another since there may be system configurations in which only one of the ISTA 1002 or RSTA 1004 have the sensor capture capabilities described herein. The indication may be signaled during an exchange of device capabilities between the ISTA 1002 and RSTA 1004.

Figure 11:
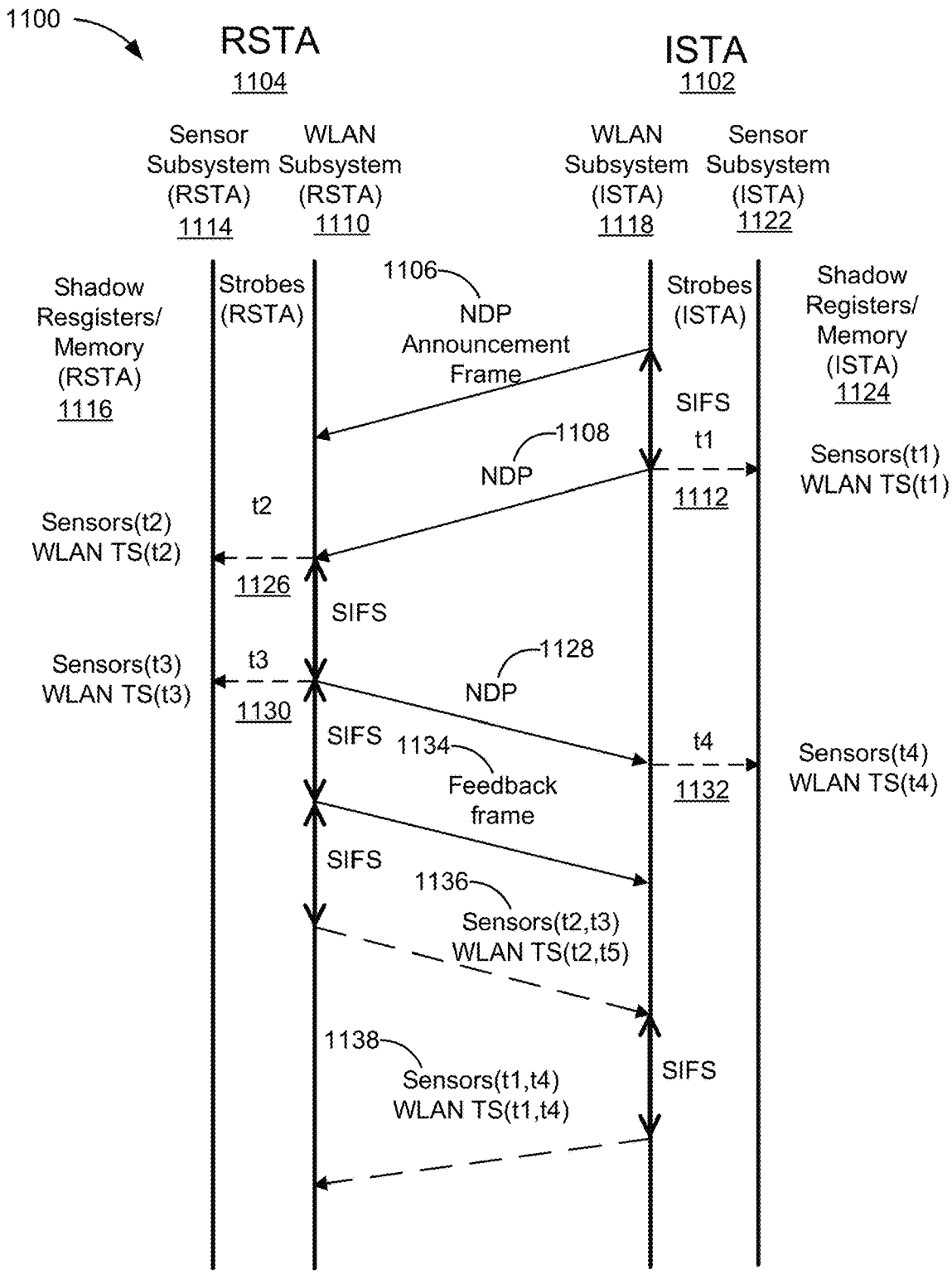
FIG. 11 is an example message flow showing synchronization between time measurement data and motion/heading/orientation sensor data when applied to an NDP ranging measurement protocol in accordance with certain aspects of the disclosure.

FIG. 11 is an example message flow 1100 showing synchronization between time measurement data and motion/heading/orientation sensor data when applied to an NDP ranging measurement protocol in accordance with certain aspects of the disclosure. The example message flow 1100 shown in FIG. 11 is an exchange of messages between an ISTA 1102 and an RSTA 1104. In this context, the ISTA 1102 or RSTA 1104 may comprise any one of several transceiver devices, including a mobile device or stationary access transceiver device. As shown in FIG. 11, the ISTA 1102 transmits a physical layer protocol data unit (PPDU)

that includes an NDP announcement frame 1106. The NDPA frame 1106 is configured to cause the RSTA 1104 to be prepared to receive an NDP from the ISTA 1102 as part of a ranging measurement procedure. In certain aspects, the NDPA frame 1106 in the PPDU includes parameters for the RSTA 1104 to use when participating in the ranging message flow 1100. The NDPA frame 1106 for ranging measurements may be in the form of the NDP 600 shown in FIG. 6.

The ISTA 1102 generates a PPDU having at least one NDP 1108 and begins transmitting the PPDU with the NDP 1108 at time $t_1$, which occurs at a defined time period SIFS after an end of the preceding PPDU with the NDP announcement frame 1106. In an aspect, the defined time period is a short interframe space (SIFS). In certain aspects, another suitable time period may be utilized. The NDP 1108 includes a preamble having one or more STFs, one or more LTFs, and one or more signal fields such as those shown in FIG. 6. In an aspect, the preamble of the NDP 1108 includes i) a legacy portion having an L-STF, an L-LTF, and an L-SIG, and ii) a non-legacy portion having an HE-STF, one or more HE-LTFs, and one or more HE-SIGs. In certain aspects, multiple NDPs 1108 are transmitted in the PPDU, the different NDPs 1108 being transmitted in different frequency bandwidth portions. In certain aspects in which multiple NDPs 1108 are transmitted, two or more of the NDPs 1108 are transmitted within the same frequency band (e.g., two or more of the NDPs 1108 span the same frequency band) using different spatial streams (e.g., the two or more NDPs 1108 are transmitted using MU-MIMO).

In the example shown in FIG. 11, the NDP 1108 is a ranging NDP having a format such as the one shown and described in FIG. 6, which includes signals that are particular to a ranging measurement procedure. As such, the NDP 1108 has a format that is different than NDPs that are used for purposes other than ranging measurements, and/or includes signals that are different than NDPs that are used for purposes other than ranging measurements such as NDPs used in connection with performing channel measurements, NDPs used in connection with performing beamforming measurements, etc.

When transmitting the NDP 1108, a WLAN subsystem 1118 of the ISTA 1102 generates a timestamp WLAN TS(t1) at time $t_1$ corresponding to the time at which the ISTA 1102 began transmitting a particular portion of the NDP 1108 (e.g., a particular HE-LTF in the NDP 714) at an antenna of the ISTA 1102. The WLAN subsystem 1118 also generates a strobe signal 1112 to a sensor subsystem 1122 of the ISTA 1102, which triggers the sensor subsystem 1122 to capture and store the output of its sensors (Sensors(t1)) in memory 1124 (e.g., shadow registers or other memory) of the ISTA 1102. Additionally, the timestamp WLAN(t1) is correlated with sensor data Sensors(t1) in the memory 1124.

Similarly, when the RSTA 1104 receives the NDP 1108, a WLAN subsystem 1110 of the RSTA 1104 generates a timestamp WLAN TS(t2) at time $t_2$ at corresponding to the time at which the RSTA 1104 began receiving the particular portion of the NDP 1108 (e.g., the particular HE-LTF in the NDP 1108) at an antenna of the RSTA 1104. The WLAN subsystem 1110 also generates a strobe signal 1126 to a sensor subsystem 1114 of the RSTA 1104, which triggers the sensor subsystem 1114 to capture and store the output of its sensors (Sensors(t2)) in memory 1116 (e.g., shadow registers or other memory) of the RSTA 1104. Additionally, the timestamp WLAN(t2) is correlated with sensor data Sensors(t2) in the memory 1116.

Responsive to receiving the NDP 1108, the WLAN subsystem 1110 begins transmitting a PPDU including an NDP 1128 at a defined time period SIFS after the NDP 1108 has been received at the RSTA 1104. When transmitting the NDP 1128, the WLAN subsystem 1110 generates a timestamp WLAN TS(t3) at time $t_3$ corresponding to the time at which the RSTA 1104 began transmitting a particular portion of the NDP 1128 (e.g., a particular HE-LTF in the NDP 1128) from its antenna. The WLAN subsystem 1110 also generates a strobe signal 1130 to the sensor subsystem 1114 of the RSTA 1104, which triggers the sensor subsystem 1114 to capture and store the output of its sensors (Sensors(t3)) in memory 1116 (e.g., shadow registers or other memory) of the RSTA 1104. Additionally, the timestamp WLAN(t3) is correlated with sensor data Sensors(t3) in the memory 1116.

When the ISTA 1102 receives the NDP 1128, the ISTA 1102 generates a timestamp WLAN TS(t4) at time $t_4$ corresponding to the time at which the ISTA 1102 began receiving the particular portion of the NDP 1128 (e.g., the particular HE-LTF in the NDP 1128) at its antenna. The WLAN subsystem 1118 also generates a strobe signal 1132 to the sensor subsystem 1122, which triggers the sensor subsystem 1122 to capture and store the output of its sensors (Sensors (t4)) in memory 1124. Additionally, the timestamp WLAN (t4) is correlated with sensor data Sensors(t4) in the memory 1124.

In certain aspects, the RSTA 1104 transmits a PPDU including a feedback (FB) frame 1134 a defined time period SIFS after the PPDU including NDP 1128 has been transmitted. The FB frame 1134 includes the recorded time stamps WLAN TS(t2) and WLAN TS(t3) respectively corresponding to times $t_2$ and $t_4$. In certain aspects, the FB frame 1134 may optionally include channel estimate information determined by the RSTA 1104 based on the reception of the NDP 1108.

After receipt of the FB frame 1032, the ISTA 1102 determines an RTT measurement between the ISTA 1102 and the RSTA 1104 using the recorded times $t_1$, $t_2$, $t_3$, and $t_4$. Any suitable technique may be utilized to determine the RTT measurement using the recorded times $t_1$, $t_2$, $t_3$, and $t_4$. The distance between the ISTA 702 and the RSTA 704 may be calculated as $d=RTT \cdot c/2$, where c, is the speed of electromagnetic wave propagation. In certain aspects, the ISTA 1102 determines an estimated position of the ISTA 1102 and/or an estimated position of the RSTA 1104 using the measured RTT. In an aspect, the ISTA 1102 may use a triangulation technique to calculate the estimated positions. Additionally, the ISTA 1102 may use the sensor data Sensors (t1) and Sensors(t4) to further refine ranging and/or positioning determinations.

In accordance with certain aspects of the disclosure, the ISTA 1102 and RSTA 1104 may optionally exchange sensor data captured at the times $t_1$, $t_2$, $t_3$, $t_4$. To this end, RSTA 1104 may optionally transmit a sensor and timestamp frame 1136, including sensor data Sensors(t2,t3) and corresponding time stamps WLAN TS(t2,t3) to the ISTA 1102. The ISTA 1102 may determine the motion/heading/orientation of the RSTA 1004 using sensor measurements Sensors(t2,t3) to further refine positioning determinations. Additionally, or in the alternative, the ISTA 1102 may optionally transmit a sensor and timestamp frame 1138, including sensor data Sensors(t1,t4) and corresponding time stamps WLAN TS(t1, t4) to the RSTA 1104. The RSTA 1104 may determine the motion/heading/orientation of the RSTA 1104 using sensor measurements Sensors(t1,t4), the motion/heading/orientation of the ISTA 1102 using sensor measurements Sensors (t2,t3), and the time measurements WLAN TS(t1), WLAN TS(t2), WLAN TS(t3), and WLAN TS(t4) to accurately determine its own position. In accordance with certain aspects of the disclosure, the raw sensor data may be processed by the ISTA 1102 and/or RSTA 1104 to determine motion/heading/orientation values and send the determined motion/heading/orientation values instead of the raw sensor data during the exchange of frame 1136 and/or frame 1138. Before such an exchange of sensor data, the ISTA 1102 and RSTA 1104 may indicate whether each has the capability to capture such sensor data to one another since there may be system configurations in which only one of the ISTA 1002 or RSTA 1004 have the sensor capture capabilities described herein. The indication may be signaled during an exchange of device capabilities between the ISTA 1102 and RSTA 1104.

The exchange of ranging packets (e.g., FPM frames, NDP frames, etc.) and corresponding capture of the sensor data of the sensor subsystems shown in FIG. 10 and FIG. 11 may be repeated multiple times to obtain multiple measurements that may be used for positioning purposes. In accordance with certain aspects of the disclosure, outlier timing and/or sensor measurements can be identified by checking the mean/standard deviation for the timing and/or sensor measurement data sets. Outliers may be removed before ranging and/or positioning determinations. The final data sets can be fed, for example, to an indoor triangulation algorithm.

Figure 12:
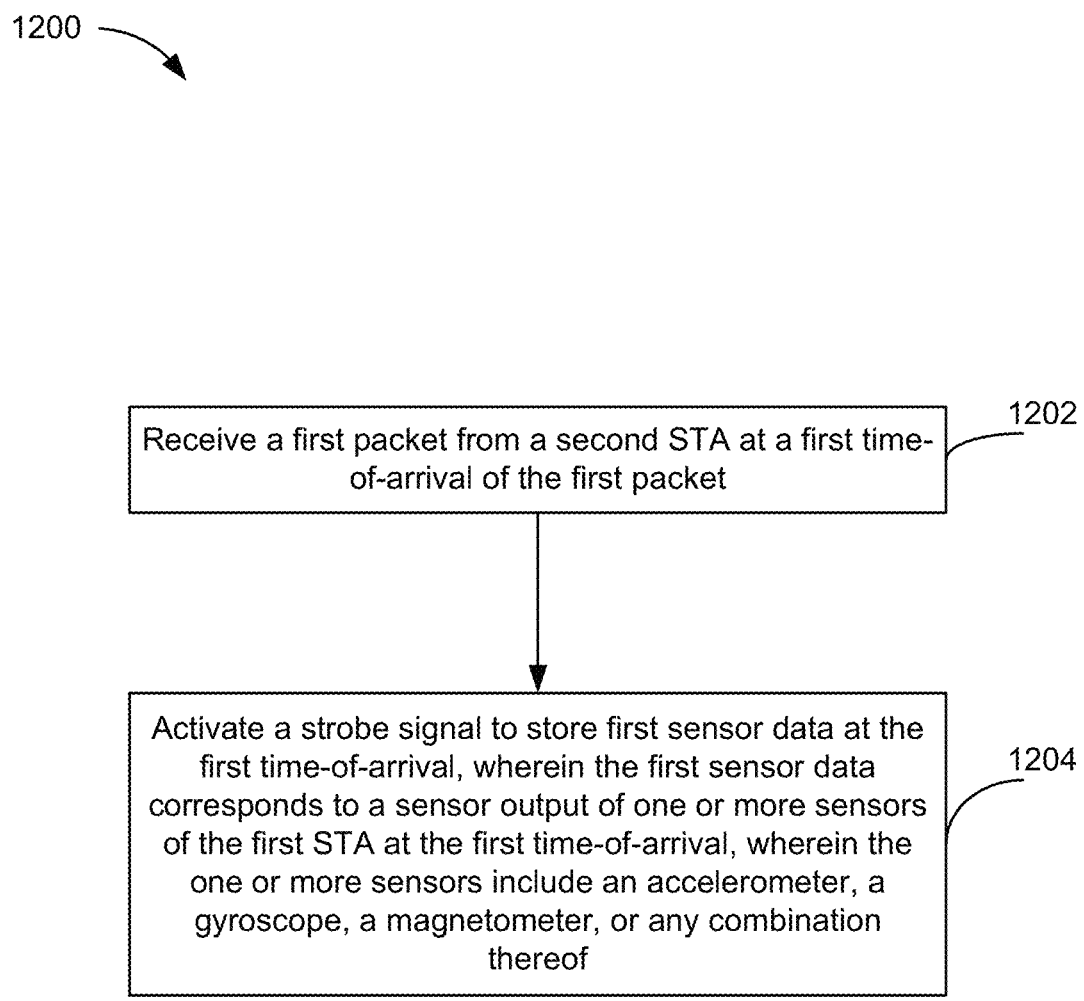
FIG. 12 illustrates an example method of wireless communication performed by a first station (STA) according to aspects of the disclosure.

FIG. 12 illustrates an example method 1200 of wireless communication performed by a first station (STA) according to aspects of the disclosure. At operation 1202, the first STA receives a first packet from a second STA at a first time-of-arrival of the first packet. In an aspect, operation 1202 may be performed by the one or more WWAN transceivers 310, the one or more processors 332, memory 340, and/or positioning component 342, any or all of which may be considered means for performing this operation.

At operation 1204, the first STA activates a strobe signal to store first sensor data at the first time-of-arrival, wherein the first sensor data corresponds to a sensor output of one or more sensors of the first STA at the first time-of-arrival, and wherein the one or more sensors include an accelerometer, a gyroscope, a magnetometer, or any combination thereof. In an aspect, operation 1204 may be performed by the one or more WWAN transceivers 310, the one or more processors 332, memory 340, and/or positioning component 342, any or all of which may be considered means for performing this operation.

Figure 13:
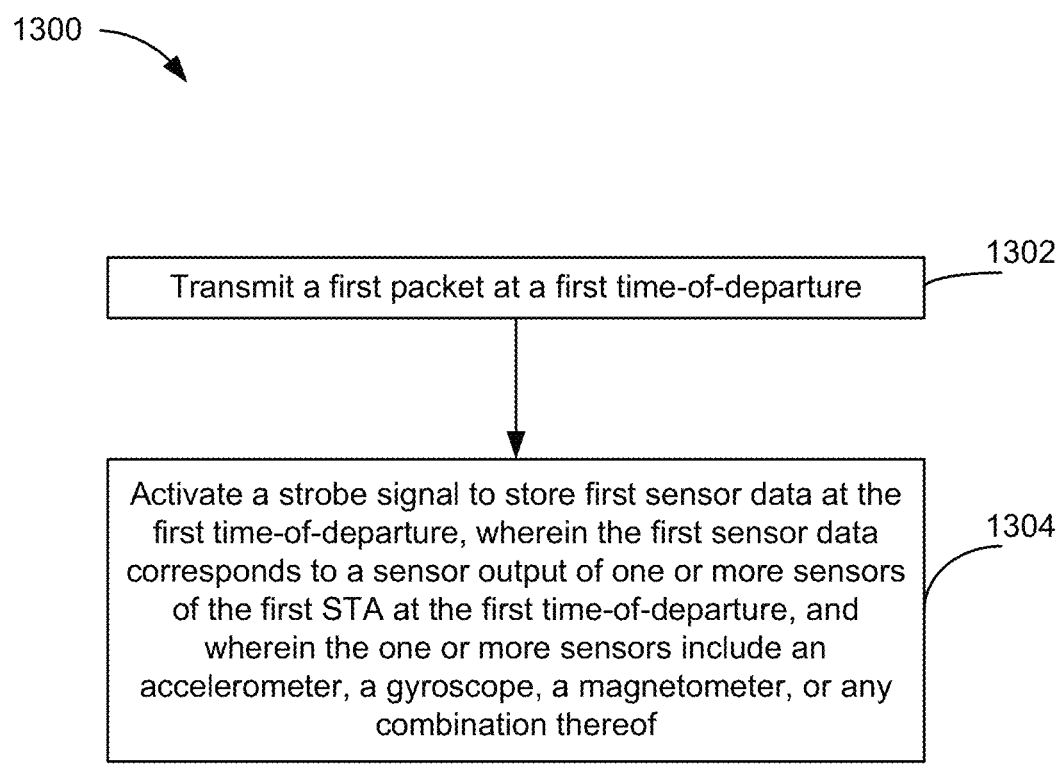
FIG. 13 illustrates an example method of wireless communication performed by a first station (STA) according to aspects of the disclosure.

FIG. 13 illustrates an example method 1300 of wireless communication performed by a first station (STA) according to aspects of the disclosure. At operation 1302, the first STA transmits a first packet at a first time-of-departure. In an aspect, operation 1302 may be performed by the one or more WWAN transceivers 310, the one or more processors 332, memory 340, and/or positioning component 342, any or all of which may be considered means for performing this operation.

At operation 1304, the first STA activates a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof. In an aspect, operation 1304 may be performed by the one or more WWAN transceivers 310, the one or more processors 332, memory 340, and/or positioning component 342, any or all of which may be considered means for performing this operation.

As will be appreciated, technical advantages of the methods 1200 and 1300 include synchronization of motion/heading/orientation sensor data with time measurement data (e.g., times-of-arrival and/or times-of-departure) of ranging packets. By synchronizing the time and sensor data, the station may more accurately determine its range and/or position with respect to other stations when using both the time measurement data and the sensor data in its ranging determinations.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a first station (STA), comprising: receiving a first packet from a second STA at a first time-of-arrival of the first packet; and activating a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof.

Clause 2. The method of clause 1, further comprising: transmitting, in response to receiving the first packet, a second packet to the second STA at a first time-of-departure of the second packet; and activating the strobe signal to store second sensor data at the first time-of-departure, wherein the second sensor data corresponds to the sensor output of the one or more sensors at the first time-of-departure.

Clause 3. The method of clause 2, wherein: the first packet is a fine time measurement packet; and the second packet is an acknowledgment of the fine time measurement packet.

Clause 4. The method of clause 3, further comprising: receiving a report from the second STA indicating at least a second time-of-departure at which the first packet was transmitted from the second STA, and a second time-of-arrival at which the second packet was received at the second STA.

Clause 5. The method of clause 4, further comprising: determining a position of the first STA based at least on the first time-of-arrival, the first time-of-departure, the second time-of-arrival, the second time-of-departure, the first sensor data, and the second sensor data.

Clause 6. The method of clause 5, wherein determining the position of the first STA comprises: executing a triangulation positioning operation using at least the first timeof-arrival, the first time-of-departure, the second time-of-arrival, the second time-of-departure, the first sensor data, and the second sensor data.

Clause 7. The method of any of clauses 2 to 6, further comprising: executing a first interrupt routine at a sensor subsystem of the first STA in response to the strobe signal at the first time-of-arrival, wherein execution of the first interrupt routine at the first time-of-arrival includes, obtaining the first sensor data from the one or more sensors; and storing the first sensor data in one or more shadow registers; and executing the first interrupt routine at the sensor subsystem of the first STA in response to the strobe signal at the first time-of-departure, wherein execution of the first interrupt routine at the first time-of-departure includes, obtaining the second sensor data from the one or more sensors; and storing the second sensor data in the one or more shadow registers.

Clause 8. The method of clause 7, further comprising: executing a second interrupt routine at a wireless local area network (WLAN) subsystem of the first STA in response to the strobe signal at the first time-of-arrival, wherein execution of the second interrupt routine at the first time-of-arrival includes, obtaining a first timestamp corresponding to the first time-of-arrival, and associating the first timestamp with the first sensor data in the one or more shadow registers; and executing the second interrupt routine at the WLAN subsystem of the first STA in response to the strobe signal at the first time-of-departure, wherein execution of the second interrupt routine at the first time-of-departure includes, obtaining a second timestamp corresponding to the first time-of-departure, and associating the second timestamp with the second sensor data in the one or more shadow registers.

Clause 9. The method of any of clauses 2 to 8, further comprising: performing a plurality of activations of the strobe signal to store a first plurality of sensor data at a corresponding first plurality of times-of-departure of packet transmissions, a second plurality of sensor data at a corresponding second plurality of times-of-arrival of packet transmissions, or any combination thereof and identifying outliers in the first plurality of sensor data, the second plurality of sensor data, or any combination thereof.

Clause 10. The method of any of clauses 1 to 9, wherein: the first STA is an initiator STA (ISTA).

Clause 11. The method of any of clauses 1 to 9, wherein: the first STA is a responding STA (RSTA).

Clause 12. A method of wireless communication performed by a first station (STA), comprising: transmitting a first packet at a first time-of-departure; and activating a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof.

Clause 13. The method of clause 12, further comprising: receiving a second packet from a second STA at a first time-of-arrival of the second packet; and activating a strobe signal to store second sensor data at the first time-of-arrival, wherein the second sensor data corresponds to the sensor output of the one or more sensors at the first time-of-arrival.

Clause 14. The method of clause 13, wherein: the first packet is a null data packet (NDP); and the second packet is a NDP received from a second STA.

Clause 15. The method of clause 14, further comprising: receiving a report from the second STA indicating at least a second time-of-arrival at which the first packet was received at the second STA, and a second time-of-departure at which the second packet was transmitted by the second STA.

Clause 16. The method of clause 15, further comprising: determining a position of the first STA based at least on the first time-of-arrival, the first time-of-departure, the second time-of-arrival, the second time-of-departure, the first sensor data, and the second sensor data.

Clause 17. The method of clause 16, wherein determining the position of the first STA comprises: executing a triangulation positioning operation using at least the first time-of-arrival, the first time-of-departure, the second time-of-arrival, the second time-of-departure, the first sensor data, and the second sensor data.

Clause 18. The method of any of clauses 13 to 17, further comprising: executing a first interrupt routine at a sensor subsystem of the first STA in response to the strobe signal at the first time-of-arrival, wherein execution of the first interrupt routine at the first time-of-arrival includes, obtaining the first sensor data from the one or more sensors, and storing the first sensor data in one or more shadow registers; and executing the first interrupt routine at the sensor subsystem of the first STA in response to the strobe signal at the first time-of-departure, wherein execution of the first interrupt routine at the first time-of-departure includes, obtaining the second sensor data from the one or more sensors, and storing the second sensor data in the one or more shadow registers.

Clause 19. The method of clause 18, further comprising: executing a second interrupt routine at a wireless local area network (WLAN) subsystem of the first STA in response to the strobe signal at the first time-of-arrival, wherein execution of the first interrupt routine at the first time-of-arrival includes, obtaining a first timestamp corresponding to the first time-of-arrival, and associating the first timestamp with the first sensor data in the one or more shadow registers; and executing the second interrupt routine at the WLAN subsystem of the first STA in response to the strobe signal at the first time-of-departure, wherein execution of the first interrupt routine at the first time-of-departure includes, obtaining a second timestamp corresponding to the first time-of-departure, and associating the second timestamp with the second sensor data in the one or more shadow registers.

Clause 20. The method of any of clauses 13 to 19, further comprising: performing a plurality of activations of the strobe signal to store a first plurality of sensor data at a corresponding first plurality of times-of-departure of packet transmissions, a second plurality of sensor data at a corresponding second plurality of times-of-arrival of packet transmissions, or any combination thereof; and identifying outliers in the first plurality of sensor data, the second plurality of sensor data, or any combination thereof.

Clause 21. The method of any of clauses 12 to 20, wherein: the first STA is an initiator STA (ISTA).

Clause 22. The method of any of clauses 12 to 20, wherein: the first STA is a responding STA (RSTA).

Clause 23. A first station (STA), comprising: a memory; at least one transceiver; and at least one processor communicatively coupled to the memory and the at least one transceiver, the at least one processor configured to: receive, via the at least one transceiver, a first packet from a second STA at a first time-of-arrival of the first packet; and activate a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof.

Clause 24. The first STA of clause 23, wherein the at least one processor is further configured to: transmit, via the at least one transceiver, in response to receiving the first packet, a second packet to the second STA at a first time-of-departure of the second packet; and activate the strobe signal to store second sensor data at the first time-of-departure, wherein the second sensor data corresponds to the sensor output of the one or more sensors at the first time-of-departure.

Clause 25. The first STA of clause 24, wherein: the first packet is a fine time measurement packet; and the second packet is an acknowledgment of the fine time measurement packet.

Clause 26. The first STA of clause 25, wherein the at least one processor is further configured to: receive, via the at least one transceiver, a report from the second STA indicating at least a second time-of-departure at which the first packet was transmitted from the second STA, and a second time-of-arrival at which the second packet was received at the second STA.

Clause 27. The first STA of clause 26, wherein the at least one processor is further configured to: determine a position of the first STA based at least on the first time-of-arrival, the first time-of-departure, the second time-of-arrival, the second time-of-departure, the first sensor data, and the second sensor data.

Clause 28. The first STA of clause 27, wherein the at least one processor configured to determine the position of the first STA comprises the at least one processor configured to: execute a triangulation positioning operation using at least the first time-of-arrival, the first time-of-departure, the second time-of-arrival, the second time-of-departure, the first sensor data, and the second sensor data.

Clause 29. The first STA of any of clauses 24 to 28, wherein the at least one processor is further configured to: execute a first interrupt routine at a sensor subsystem of the first STA in response to the strobe signal at the first time-of-arrival, wherein execution of the first interrupt routine at the first time-of-arrival includes, obtaining the first sensor data from the one or more sensors; and storing the first sensor data in one or more shadow registers; and execute the first interrupt routine at the sensor subsystem of the first STA in response to the strobe signal at the first time-of-departure, wherein execution of the first interrupt routine at the first time-of-departure includes, obtaining the second sensor data from the one or more sensors; and storing the second sensor data in the one or more shadow registers.

Clause 30. The first STA of clause 29, wherein the at least one processor is further configured to: execute a second interrupt routine at a wireless local area network (WLAN) subsystem of the first STA in response to the strobe signal at the first time-of-arrival, wherein execution of the second interrupt routine at the first time-of-arrival includes, obtaining a first timestamp corresponding to the first time-of-arrival, and associating the first timestamp with the first sensor data in the one or more shadow registers; and execute the second interrupt routine at the WLAN subsystem of the first STA in response to the strobe signal at the first time-of-departure, wherein execution of the second interrupt routine at the first time-of-departure includes, obtaining a second timestamp corresponding to the first time-of-departure, and associating the second timestamp with the second sensor data in the one or more shadow registers.

Clause 31. The first STA of any of clauses 24 to 30, wherein the at least one processor is further configured to: perform a plurality of activations of the strobe signal to store a first plurality of sensor data at a corresponding first plurality of times-of-departure of packet transmissions, a second plurality of sensor data at a corresponding second plurality of times-of-arrival of packet transmissions, or any combination thereof; and identify outliers in the first plurality of sensor data, the second plurality of sensor data, or any combination thereof.

Clause 32. The first STA of any of clauses 23 to 31, wherein: the first STA is an initiator STA (ISTA).

Clause 33. The first STA of any of clauses 23 to 31, wherein: the first STA is a responding STA (RSTA).

Clause 34. A first STA, comprising: a memory; at least one transceiver; and at least one processor communicatively coupled to the memory and the at least one transceiver, the at least one processor configured to: transmit, via the at least one transceiver, a first packet at a first time-of-departure; and activate a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof.

Clause 35. The first STA of clause 34, wherein the at least one processor is further configured to: receive, via the at least one transceiver, a second packet from a second STA at a first time-of-arrival of the second packet; and activate a strobe signal to store second sensor data at the first time-of-arrival, wherein the second sensor data corresponds to the sensor output of the one or more sensors at the first time-of-arrival.

Clause 36. The first STA of clause 35, wherein: the first packet is a null data packet (NDP); and the second packet is a NDP received from a second STA.

Clause 37. The first STA of clause 36, wherein the at least one processor is further configured to: receive, via the at least one transceiver, a report from the second STA indicating at least a second time-of-arrival at which the first packet was received at the second STA, and a second time-of-departure at which the second packet was transmitted by the second STA.

Clause 38. The first STA of clause 37, wherein the at least one processor is further configured to: determine a position of the first STA based at least on the first time-of-arrival, the first time-of-departure, the second time-of-arrival, the second time-of-departure, the first sensor data, and the second sensor data.

Clause 39. The first STA of clause 38, wherein the at least one processor configured to determine the position of the first STA comprises the at least one processor configured to: execute a triangulation positioning operation using at least the first time-of-arrival, the first time-of-departure, the second time-of-arrival, the second time-of-departure, the first sensor data, and the second sensor data.

Clause 40. The first STA of any of clauses 35 to 39, wherein the at least one processor is further configured to: execute a first interrupt routine at a sensor subsystem of the first STA in response to the strobe signal at the first time-of-arrival, wherein execution of the first interrupt routine at the first time-of-arrival includes, obtain the first sensor data from the one or more sensors, and store the first sensor data in one or more shadow registers; and execute the first interrupt routine at the sensor subsystem of the first STA in response to the strobe signal at the first time-of-departure, wherein execution of the first interrupt routine at the first time-of-departure includes, obtain the second sensor data from the one or more sensors, and store the second sensor data in the one or more shadow registers.

Clause 41. The first STA of clause 40, wherein the at least one processor is further configured to: execute a second interrupt routine at a wireless local area network (WLAN) subsystem of the first STA in response to the strobe signal at the first time-of-arrival, wherein execution of the first interrupt routine at the first time-of-arrival includes, obtain a first timestamp corresponding to the first time-of-arrival, and associate the first timestamp with the first sensor data in the one or more shadow registers; and execute the second interrupt routine at the WLAN subsystem of the first STA in response to the strobe signal at the first time-of-departure, wherein execution of the first interrupt routine at the first time-of-departure includes, obtain a second timestamp corresponding to the first time-of-departure, and associate the second timestamp with the second sensor data in the one or more shadow registers.

Clause 42. The first STA of any of clauses 35 to 41, wherein the at least one processor is further configured to: perform a plurality of activations of the strobe signal to store a first plurality of sensor data at a corresponding first plurality of times-of-departure of packet transmissions, a second plurality of sensor data at a corresponding second plurality of times-of-arrival of packet transmissions, or any combination thereof and identify outliers in the first plurality of sensor data, the second plurality of sensor data, or any combination thereof.

Clause 43. The first STA of any of clauses 34 to 42, wherein: the first STA is an initiator STA (ISTA).

Clause 44. The first STA of any of clauses 34 to 42, wherein: the first STA is a responding STA (RSTA).

Clause 45. A first station (STA), comprising: means for receiving a first packet from a second STA at a first time-of-arrival of the first packet; and means for activating a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof.

Clause 46. The first STA of clause 45, further comprising: means for transmitting, in response to receiving the first packet, a second packet to the second STA at a first time-of-departure of the second packet; and means for activating the strobe signal to store second sensor data at the first time-of-departure, wherein the second sensor data corresponds to the sensor output of the one or more sensors at the first time-of-departure.

Clause 47. The first STA of clause 46, wherein: the first packet is a fine time measurement packet; and the second packet is an acknowledgment of the fine time measurement packet.

Clause 48. The first STA of clause 47, further comprising: means for receiving a report from the second STA indicating at least a second time-of-departure at which the first packet was transmitted from the second STA, and a second time-of-arrival at which the second packet was received at the second STA.

Clause 49. The first STA of clause 48, further comprising: means for determining a position of the first STA based at least on the first time-of-arrival, the first time-of-departure, the second time-of-arrival, the second time-of-departure, the first sensor data, and the second sensor data.

Clause 50. The first STA of clause 49, wherein the means for determining the position of the first STA comprises: means for executing a triangulation positioning operation using at least the first time-of-arrival, the first time-of-departure, the second time-of-arrival, the second time-of-departure, the first sensor data, and the second sensor data.

Clause 51. The first STA of any of clauses 46 to 50, further comprising: means for executing a first interrupt routine at a sensor subsystem of the first STA in response to the strobe signal at the first time-of-arrival, wherein execution of the first interrupt routine at the first time-of-arrival includes, means for obtaining the first sensor data from the one or more sensors; and means for storing the first sensor data in one or more shadow registers; and means for executing the first interrupt routine at the sensor subsystem of the first STA in response to the strobe signal at the first time-of-departure, wherein execution of the first interrupt routine at the first time-of-departure includes, means for obtaining the second sensor data from the one or more sensors; and means for storing the second sensor data in the one or more shadow registers.

Clause 52. The first STA of clause 51, further comprising: means for executing a second interrupt routine at a wireless local area network (WLAN) subsystem of the first STA in response to the strobe signal at the first time-of-arrival, wherein execution of the second interrupt routine at the first time-of-arrival includes, means for obtaining a first timestamp corresponding to the first time-of-arrival, and means for associating the first timestamp with the first sensor data in the one or more shadow registers; and means for executing the second interrupt routine at the WLAN subsystem of the first STA in response to the strobe signal at the first time-of-departure, wherein execution of the second interrupt routine at the first time-of-departure includes, means for obtaining a second timestamp corresponding to the first time-of-departure, and means for associating the second timestamp with the second sensor data in the one or more shadow registers.

Clause 53. The first STA of any of clauses 46 to 52, further comprising: means for performing a plurality of activations of the strobe signal to store a first plurality of sensor data at a corresponding first plurality of times-of-departure of packet transmissions, a second plurality of sensor data at a corresponding second plurality of times-of-arrival of packet transmissions, or any combination thereof; and means for identifying outliers in the first plurality of sensor data, the second plurality of sensor data, or any combination thereof.

Clause 54. The first STA of any of clauses 45 to 53, wherein: the first STA is an initiator STA (ISTA).

Clause 55. The first STA of any of clauses 45 to 53, wherein: the first STA is a responding STA (RSTA).

Clause 56. A first STA, comprising: means for transmitting a first packet at a first time-of-departure; and means for activating a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof.

Clause 57. The first STA of clause 56, further comprising: means for receiving a second packet from a second STA at a first time-of-arrival of the second packet; and means for activating a strobe signal to store second sensor data at the first time-of-arrival, wherein the second sensor data corresponds to the sensor output of the one or more sensors at the first time-of-arrival.

Clause 58. The first STA of clause 57, wherein: the first packet is a null data packet (NDP); and the second packet is a NDP received from a second STA.

Clause 59. The first STA of clause 58, further comprising: means for receiving a report from the second STA indicating at least a second time-of-arrival at which the first packet was received at the second STA, and a second time-of-departure at which the second packet was transmitted by the second STA.

Clause 60. The first STA of clause 59, further comprising: means for determining a position of the first STA based at least on the first time-of-arrival, the first time-of-departure, the second time-of-arrival, the second time-of-departure, the first sensor data, and the second sensor data.

Clause 61. The first STA of clause 60, wherein the means for determining the position of the first STA comprises: means for executing a triangulation positioning operation using at least the first time-of-arrival, the first time-of-departure, the second time-of-arrival, the second time-of-departure, the first sensor data, and the second sensor data.

Clause 62. The first STA of any of clauses 57 to 61, further comprising: means for executing a first interrupt routine at a sensor subsystem of the first STA in response to the strobe signal at the first time-of-arrival, wherein execution of the first interrupt routine at the first time-of-arrival includes, means for obtaining the first sensor data from the one or more sensors, and means for storing the first sensor data in one or more shadow registers; and means for executing the first interrupt routine at the sensor subsystem of the first STA in response to the strobe signal at the first time-of-departure, wherein execution of the first interrupt routine at the first time-of-departure includes, means for obtaining the second sensor data from the one or more sensors, and means for storing the second sensor data in the one or more shadow registers.

Clause 63. The first STA of clause 62, further comprising: means for executing a second interrupt routine at a wireless local area network (WLAN) subsystem of the first STA in response to the strobe signal at the first time-of-arrival, wherein execution of the first interrupt routine at the first time-of-arrival includes, means for obtaining a first timestamp corresponding to the first time-of-arrival, and means for associating the first timestamp with the first sensor data in the one or more shadow registers; and means for executing the second interrupt routine at the WLAN subsystem of the first STA in response to the strobe signal at the first time-of-departure, wherein execution of the first interrupt routine at the first time-of-departure includes, means for obtaining a second timestamp corresponding to the first time-of-departure, and means for associating the second timestamp with the second sensor data in the one or more shadow registers.

Clause 64. The first STA of any of clauses 57 to 63, further comprising: means for performing a plurality of activations of the strobe signal to store a first plurality of sensor data at a corresponding first plurality of times-of-departure of packet transmissions, a second plurality of sensor data at a corresponding second plurality of times-of-arrival of packet transmissions, or any combination thereof; and means for identifying outliers in the first plurality of sensor data, the second plurality of sensor data, or any combination thereof.

Clause 65. The first STA of any of clauses 56 to 64, wherein: the first STA is an initiator STA (ISTA).

Clause 66. The first STA of any of clauses 56 to 64, wherein: the first STA is a responding STA (RSTA).

Clause 67. A non-transitory computer-readable medium storing computer-executable instructions that, when executed by a first station (STA), cause the first STA to: receive a first packet from a second STA at a first time-of-arrival of the first packet; and activate a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof.

Clause 68. The non-transitory computer-readable medium of clause 67, further comprising computer-executable instructions that, when executed by the first STA, cause the first STA to: transmit, in response to receiving the first packet, a second packet to the second STA at a first time-of-departure of the second packet; and activate the strobe signal to store second sensor data at the first time-of-departure, wherein the second sensor data corresponds to the sensor output of the one or more sensors at the first time-of-departure.

Clause 69. The non-transitory computer-readable medium of clause 68, wherein: the first packet is a fine time measurement packet; and the second packet is an acknowledgment of the fine time measurement packet.

Clause 70. The non-transitory computer-readable medium of clause 69, further comprising computer-executable instructions that, when executed by the first STA, cause the first STA to: receive a report from the second STA indicating at least a second time-of-departure at which the first packet was transmitted from the second STA, and a second time-of-arrival at which the second packet was received at the second STA.

Clause 71. The non-transitory computer-readable medium of clause 70, further comprising computer-executable instructions that, when executed by the first STA, cause the first STA to: determine a position of the first STA based at least on the first time-of-arrival, the first time-of-departure, the second time-of-arrival, the second time-of-departure, the first sensor data, and the second sensor data.

Clause 72. The non-transitory computer-readable medium of clause 71, wherein the computer-executable instructions that, when executed by the first STA, cause the first STA to determine the position of the first STA comprise computer-executable instructions that, when executed by the first STA, cause the first STA to: execute a triangulation positioning operation using at least the first time-of-arrival, the first time-of-departure, the second time-of-arrival, the second time-of-departure, the first sensor data, and the second sensor data.

Clause 73. The non-transitory computer-readable medium of any of clauses 68 to 72, further comprising computer-executable instructions that, when executed by the first STA, cause the first STA to: execute a first interrupt routine at a sensor subsystem of the first STA in response to the strobe signal at the first time-of-arrival, wherein execution of the first interrupt routine at the first time-of-arrival includes, obtain the first sensor data from the one or more sensors; and store the first sensor data in one or more shadow registers; and execute the first interrupt routine at the sensor subsystem of the first STA in response to the strobe signal at the first time-of-departure, wherein execution of the first interrupt routine at the first time-of-departure includes, obtain the second sensor data from the one or more sensors; and store the second sensor data in the one or more shadow registers.

Clause 74. The non-transitory computer-readable medium of clause 73, further comprising computer-executable instructions that, when executed by the first STA, cause the first STA to: execute a second interrupt routine at a wireless local area network (WLAN) subsystem of the first STA in response to the strobe signal at the first time-of-arrival, wherein execution of the second interrupt routine at the first time-of-arrival includes, obtain a first timestamp corresponding to the first time-of-arrival, and associate the first timestamp with the first sensor data in the one or more shadow registers; and execute the second interrupt routine at the WLAN subsystem of the first STA in response to the strobe signal at the first time-of-departure, wherein execution of the second interrupt routine at the first time-of-departure includes, obtain a second timestamp corresponding to the first time-of-departure, and associate the second timestamp with the second sensor data in the one or more shadow registers.

Clause 75. The non-transitory computer-readable medium of any of clauses 68 to 74, further comprising computer-executable instructions that, when executed by the first STA, cause the first STA to: perform a plurality of activations of the strobe signal to store a first plurality of sensor data at a corresponding first plurality of times-of-departure of packet transmissions, a second plurality of sensor data at a corresponding second plurality of times-of-arrival of packet transmissions, or any combination thereof; and identify outliers in the first plurality of sensor data, the second plurality of sensor data, or any combination thereof.

Clause 76. The non-transitory computer-readable medium of any of clauses 67 to 75, wherein: the first STA is an initiator STA (ISTA).

Clause 77. The non-transitory computer-readable medium of any of clauses 67 to 75, wherein: the first STA is a responding STA (RSTA).

Clause 78. A non-transitory computer-readable medium storing computer-executable instructions that, when executed by a STA, cause a first STA to: transmit a first packet at a first time-of-departure; and activate a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof.

Clause 79. The non-transitory computer-readable medium of clause 78, further comprising computer-executable instructions that, when executed by the first STA, cause the first STA to: receive a second packet from a second STA at a first time-of-arrival of the second packet; and activate a strobe signal to store second sensor data at the first time-of-arrival, wherein the second sensor data corresponds to the sensor output of the one or more sensors at the first time-of-arrival.

Clause 80. The non-transitory computer-readable medium of clause 79, wherein: the first packet is a null data packet (NDP); and the second packet is a NDP received from a second STA.

Clause 81. The non-transitory computer-readable medium of clause 80, further comprising computer-executable instructions that, when executed by the first STA, cause the first STA to: receive a report from the second STA indicating at least a second time-of-arrival at which the first packet was received at the second STA, and a second time-of-departure at which the second packet was transmitted by the second STA.

Clause 82. The non-transitory computer-readable medium of clause 81, further comprising computer-executable instructions that, when executed by the first STA, cause the first STA to: determine a position of the first STA based at least on the first time-of-arrival, the first time-of-departure, the second time-of-arrival, the second time-of-departure, the first sensor data, and the second sensor data.

Clause 83. The non-transitory computer-readable medium of clause 82, wherein the computer-executable instructions that, when executed by the first STA, cause the first STA to determine the position of the first STA comprise computer-executable instructions that, when executed by the first STA, cause the first STA to: execute a triangulation positioning operation using at least the first time-of-arrival, the first time-of-departure, the second time-of-arrival, the second time-of-departure, the first sensor data, and the second sensor data.

Clause 84. The non-transitory computer-readable medium of any of clauses 79 to 83, further comprising computer-executable instructions that, when executed by the first STA, cause the first STA to: execute a first interrupt routine at a sensor subsystem of the first STA in response to the strobe signal at the first time-of-arrival, wherein execution of the first interrupt routine at the first time-of-arrival includes, obtain the first sensor data from the one or more sensors, and store the first sensor data in one or more shadow registers; and execute the first interrupt routine at the sensor subsystem of the first STA in response to the strobe signal at the first time-of-departure, wherein execution of the first interrupt routine at the first time-of-departure includes, obtain the second sensor data from the one or more sensors, and store the second sensor data in the one or more shadow registers.

Clause 85. The non-transitory computer-readable medium of clause 84, further comprising computer-executable instructions that, when executed by the first STA, cause the first STA to: execute a second interrupt routine at a wireless local area network (WLAN) subsystem of the first STA in response to the strobe signal at the first time-of-arrival, wherein execution of the first interrupt routine at the first time-of-arrival includes, obtain a first timestamp corresponding to the first time-of-arrival, and associate the first timestamp with the first sensor data in the one or more shadow registers; and execute the second interrupt routine at the WLAN subsystem of the first STA in response to the strobe signal at the first time-of-departure, wherein execution of the first interrupt routine at the first time-of-departure includes, obtain a second timestamp corresponding to the first time-of-departure, and associate the second timestamp with the second sensor data in the one or more shadow registers.

Clause 86. The non-transitory computer-readable medium of any of clauses 79 to 85, further comprising computer-executable instructions that, when executed by the first STA, cause the first STA to: perform a plurality of activations of the strobe signal to store a first plurality of sensor data at a corresponding first plurality of times-of-departure of packet transmissions, a second plurality of sensor data at a corresponding second plurality of times-of-arrival of packet transmissions, or any combination thereof; and identify outliers in the first plurality of sensor data, the second plurality of sensor data, or any combination thereof.

Clause 87. The non-transitory computer-readable medium of any of clauses 78 to 86, wherein: the first STA is an initiator STA (ISTA).

Clause 88. The non-transitory computer-readable medium of any of clauses 78 to 86, wherein: the first STA is a responding STA (RSTA).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a first station (STA), comprising:
   receiving a first packet from a second STA at a first time-of-arrival of the first packet; and
   generating a strobe signal to store first sensor data at the first time-of-arrival;
   executing a first interrupt routine at a sensor subsystem of the first STA in response to the strobe signal at the first time-of-arrival, wherein execution of the first interrupt routine at the first time-of-arrival includes,
      obtaining first sensor data from one or more sensors, wherein the first sensor data corresponds to a sensor output of one or more sensors of the first STA at the first time-of-arrival, wherein the one or more sensors include an accelerometer, a gyroscope, a magnetometer, or any combination thereof, and
      storing the first sensor data in one or more shadow registers;
   transmitting, in response to receiving the first packet, a second packet to the second STA at a first time-of-departure of the second packet;
   generating the strobe signal to store second sensor data at the first time-of-departure, wherein the second sensor data corresponds to the sensor output of the one or more sensors at the first time-of-departure; and
   executing the first interrupt routine at the sensor subsystem of the first STA in response to the strobe signal at the first time-of-departure, wherein execution of the first interrupt routine at the first time-of-departure includes,
      obtaining the second sensor data from the one or more sensors, and
      storing the second sensor data in the one or more shadow registers.

2. The method of claim 1, wherein:
   the first packet is a fine time measurement packet; and
   the second packet is an acknowledgment of the fine time measurement packet.

3. The method of claim 2, further comprising:
   receiving a report from the second STA indicating at least a second time-of-departure at which the first packet was transmitted from the second STA, and a second time-of-arrival at which the second packet was received at the second STA.

4. The method of claim 3, further comprising:
determining a position of the first STA based at least on the first time-of-arrival, the first time-of-departure, the second time-of-arrival, the second time-of-departure, the first sensor data, and the second sensor data.

5. The method of claim 4, wherein determining the position of the first STA comprises:
executing a triangulation positioning operation using at least the first time-of-arrival, the first time-of-departure, the second time-of-arrival, the second time-of-departure, the first sensor data, and the second sensor data.

6. The method of claim 1, further comprising:
executing a second interrupt routine at a wireless local area network (WLAN) subsystem of the first STA in response to the strobe signal at the first time-of-arrival, wherein execution of the second interrupt routine at the first time-of-arrival includes,
obtaining a first timestamp corresponding to the first time-of-arrival, and
associating the first timestamp with the first sensor data in the one or more shadow registers; and
executing the second interrupt routine at the WLAN subsystem of the first STA in response to the strobe signal at the first time-of-departure, wherein execution of the second interrupt routine at the first time-of-departure includes,
obtaining a second timestamp corresponding to the first time-of-departure, and
associating the second timestamp with the second sensor data in the one or more shadow registers.

7. The method of claim 1, further comprising:
performing a plurality of activations of the strobe signal to store
a first plurality of sensor data at a corresponding first plurality of times-of-departure of packet transmissions,
a second plurality of sensor data at a corresponding second plurality of times-of-arrival of packet transmissions, or
any combination thereof, and
identifying outliers in the first plurality of sensor data, the second plurality of sensor data, or any combination thereof.

8. The method of claim 1, wherein:
the first STA is an initiator STA (ISTA).

9. The method of claim 1, wherein:
the first STA is a responding STA (RSTA).

10. A method of wireless communication performed by a first station (STA), comprising:
transmitting a first packet at a first time-of-departure; and
generating a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof;
executing a first interrupt routine at a sensor subsystem of the first STA in response to the strobe signal at the first time-of-departure, wherein execution of the first interrupt routine at the first time-of-departure includes,
obtaining the first sensor data from the one or more sensors, and
storing the first sensor data in one or more shadow registers;
receiving a second packet from a second STA at a first time-of-arrival of the second packet; and
generating the strobe signal to store second sensor data at the first time-of-arrival, wherein the second sensor data corresponds to the sensor output of the one or more sensors at the first time-of-arrival; and
executing the first interrupt routine at the sensor subsystem of the first STA in response to the strobe signal at the first time-of-arrival, wherein execution of the first interrupt routine at the first time-of-arrival includes,
obtaining the second sensor data from the one or more sensors, and
storing the second sensor data in the one or more shadow registers.

11. The method of claim 10, wherein:
the first packet is a null data packet (NDP); and
the second packet is a NDP received from a second STA.

12. The method of claim 11, further comprising:
receiving a report from the second STA indicating at least a second time-of-arrival at which the first packet was received at the second STA, and a second time-of-departure at which the second packet was transmitted by the second STA.

13. The method of claim 12, further comprising:
determining a position of the first STA based at least on the first time-of-arrival, the first time-of-departure, the second time-of-arrival, the second time-of-departure, the first sensor data, and the second sensor data.

14. The method of claim 13, wherein determining the position of the first STA comprises:
executing a triangulation positioning operation using at least the first time-of-arrival, the first time-of-departure, the second time-of-arrival, the second time-of-departure, the first sensor data, and the second sensor data.

15. The method of claim 10, further comprising:
executing a second interrupt routine at a wireless local area network (WLAN) subsystem of the first STA in response to the strobe signal at the first time-of-arrival, wherein execution of the first interrupt routine at the first time-of-arrival includes,
obtaining a first timestamp corresponding to the first time-of-arrival, and
associating the first timestamp with the first sensor data in the one or more shadow registers; and
executing the second interrupt routine at the WLAN subsystem of the first STA in response to the strobe signal at the first time-of-departure, wherein execution of the first interrupt routine at the first time-of-departure includes,
obtaining a second timestamp corresponding to the first time-of-departure, and
associating the second timestamp with the second sensor data in the one or more shadow registers.

16. The method of claim 10, further comprising:
performing a plurality of activations of the strobe signal to store
a first plurality of sensor data at a corresponding first plurality of times-of-departure of packet transmissions,
a second plurality of sensor data at a corresponding second plurality of times-of-arrival of packet transmissions, or
any combination thereof, and
identifying outliers in the first plurality of sensor data, the second plurality of sensor data, or any combination thereof.

17. The method of claim 10, wherein:
the first STA is an initiator STA (ISTA).

18. The method of claim 10, wherein:
the first STA is a responding STA (RSTA).

19. A first station (STA), comprising:
a memory;
at least one transceiver; and
at least one processor communicatively coupled to the memory and the at least one transceiver, the at least one processor configured to:
receive, via the at least one transceiver, a first packet from a second STA at a first time-of-arrival of the first packet; and
generating a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof;
execute a first interrupt routine at a sensor subsystem of the first STA in response to the strobe signal at the first time-of-arrival, wherein execution of the first interrupt routine at the first time-of-arrival includes,
obtain the first sensor data from the one or more sensors, and
store the first sensor data in one or more shadow registers;
transmit, via the at least one transceiver, in response to receiving the first packet, a second packet to the second STA at a first time-of-departure of the second packet;
generate the strobe signal to store second sensor data at the first time-of-departure, wherein the second sensor data corresponds to the sensor output of the one or more sensors at the first time-of-departure; and
execute the first interrupt routine at the sensor subsystem of the first STA in response to the strobe signal at the first time-of-departure, wherein execution of the first interrupt routine at the first time-of-departure includes,
obtaining the second sensor data from the one or more sensors, and
storing the second sensor data in the one or more shadow registers.

20. The first STA of claim 19, wherein:
the first packet is a fine time measurement packet; and
the second packet is an acknowledgment of the fine time measurement packet.

21. The first STA of claim 20, wherein the at least one processor is further configured to:
receive, via the at least one transceiver, a report from the second STA indicating at least a second time-of-departure at which the first packet was transmitted from the second STA, and a second time-of-arrival at which the second packet was received at the second STA.

22. The first STA of claim 21, wherein the at least one processor is further configured to:
determine a position of the first STA based at least on the first time-of-arrival, the first time-of-departure, the second time-of-arrival, the second time-of-departure, the first sensor data, and the second sensor data.

23. The first STA of claim 22, wherein the at least one processor configured to determine the position of the first STA comprises the at least one processor configured to:
execute a triangulation positioning operation using at least the first time-of-arrival, the first time-of-departure, the second time-of-arrival, the second time-of-departure, the first sensor data, and the second sensor data.

24. The first STA of claim 19, wherein the at least one processor is further configured to:
execute a second interrupt routine at a wireless local area network (WLAN) subsystem of the first STA in response to the strobe signal at the first time-of-arrival, wherein execution of the second interrupt routine at the first time-of-arrival includes,
obtain a first timestamp corresponding to the first time-of-arrival, and
associate the first timestamp with the first sensor data in the one or more shadow registers; and
execute the second interrupt routine at the WLAN subsystem of the first STA in response to the strobe signal at the first time-of-departure, wherein execution of the second interrupt routine at the first time-of-departure includes,
obtain a second timestamp corresponding to the first time-of-departure, and
associate the second timestamp with the second sensor data in the one or more shadow registers.

25. The first STA of claim 19, wherein the at least one processor is further configured to:
perform a plurality of activations of the strobe signal to store
a first plurality of sensor data at a corresponding first plurality of times-of-departure of packet transmissions,
a second plurality of sensor data at a corresponding second plurality of times-of-arrival of packet transmissions, or
any combination thereof; and
identify outliers in the first plurality of sensor data, the second plurality of sensor data, or any combination thereof.

26. The first STA of claim 19, wherein:
the first STA is an initiator STA (ISTA).

27. The first STA of claim 19, wherein:
the first STA is a responding STA (RSTA).

28. A first STA, comprising:
a memory;
at least one transceiver; and
at least one processor communicatively coupled to the memory and the at least one transceiver, the at least one processor configured to:
transmit, via the at least one transceiver, a first packet at a first time-of-departure; and
generate a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof;
execute a first interrupt routine at a sensor subsystem of the first STA in response to the strobe signal at the first time-of-departure, wherein execution of the first interrupt routine at the first time-of-departure includes,
obtaining the first sensor data from the one or more sensors, and
storing the first sensor data in one or more shadow registers;
receive, via the at least one transceiver, a second packet from a second STA at a first time-of-arrival of the second packet;
generate the strobe signal to store second sensor data at the first time-of-arrival, wherein the second sensor data corresponds to the sensor output of the one or more sensors at the first time-of-arrival; and
execute the first interrupt routine at the sensor subsystem of the first STA in response to the strobe signal at the first time-of-arrival, wherein execution of the first interrupt routine at the first time-of-arrival includes,
obtain the second sensor data from the one or more sensors, and
store the second sensor data in the one or more shadow registers.

29. The first STA of claim 28, wherein:
the first packet is a null data packet (NDP); and
the second packet is a NDP received from a second STA.

30. The first STA of claim 29, wherein the at least one processor is further configured to:
receive, via the at least one transceiver, a report from the second STA indicating at least a second time-of-arrival at which the first packet was received at the second STA, and a second time-of-departure at which the second packet was transmitted by the second STA.

31. The first STA of claim 30, wherein the at least one processor is further configured to:
determine a position of the first STA based at least on the first time-of-arrival, the first time-of-departure, the second time-of-arrival, the second time-of-departure, the first sensor data, and the second sensor data.

32. The first STA of claim 31, wherein the at least one processor configured to determine the position of the first STA comprises the at least one processor configured to:
execute a triangulation positioning operation using at least the first time-of-arrival, the first time-of-departure, the second time-of-arrival, the second time-of-departure, the first sensor data, and the second sensor data.

33. The first STA of claim 28, wherein the at least one processor is further configured to:
execute a second interrupt routine at a wireless local area network (WLAN) subsystem of the first STA in response to the strobe signal at the first time-of-arrival, wherein execution of the first interrupt routine at the first time-of-arrival includes,
obtain a first timestamp corresponding to the first time-of-arrival, and
associate the first timestamp with the first sensor data in the one or more shadow registers; and
execute the second interrupt routine at the WLAN subsystem of the first STA in response to the strobe signal at the first time-of-departure, wherein execution of the first interrupt routine at the first time-of-departure includes,
obtain a second timestamp corresponding to the first time-of-departure, and
associate the second timestamp with the second sensor data in the one or more shadow registers.

34. The first STA of claim 28, wherein the at least one processor is further configured to:
perform a plurality of activations of the strobe signal to store
a first plurality of sensor data at a corresponding first plurality of times-of-departure of packet transmissions,
a second plurality of sensor data at a corresponding second plurality of times-of-arrival of packet transmissions, or
any combination thereof; and
identify outliers in the first plurality of sensor data, the second plurality of sensor data, or any combination thereof.

35. The first STA of claim 28, wherein:
the first STA is an initiator STA (ISTA).

36. The first STA of claim 28, wherein:
the first STA is a responding STA (RSTA).

37. A first station (STA), comprising:
means for receiving a first packet from a second STA at a first time-of-arrival of the first packet; and
means for generating a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof;
means for executing a first interrupt routine at a sensor subsystem of the first STA in response to the strobe signal at the first time-of-arrival, wherein execution of the first interrupt routine at the first time-of-arrival includes,
means for obtaining the first sensor data from the one or more sensors, and
means for storing the first sensor data in one or more shadow registers;
means for transmitting, in response to receiving the first packet, a second packet to the second STA at a first time-of-departure of the second packet;
means for generating the strobe signal to store second sensor data at the first time-of-departure, wherein the second sensor data corresponds to the sensor output of the one or more sensors at the first time-of-departure; and
means for executing the first interrupt routine at the sensor subsystem of the first STA in response to the strobe signal at the first time-of-departure, wherein execution of the first interrupt routine at the first time-of-departure includes,
means for obtaining the second sensor data from the one or more sensors, and
means for storing the second sensor data in the one or more shadow registers.

38. The first STA of claim 37, wherein:
the first packet is a fine time measurement packet; and
the second packet is an acknowledgment of the fine time measurement packet.

39. The first STA of claim 38, further comprising:
means for receiving a report from the second STA indicating at least a second time-of-departure at which the first packet was transmitted from the second STA, and a second time-of-arrival at which the second packet was received at the second STA.

40. The first STA of claim 39, further comprising:
means for determining a position of the first STA based at least on the first time-of-arrival, the first time-of-departure, the second time-of-arrival, the second time-of-departure, the first sensor data, and the second sensor data.

41. The first STA of claim 40, wherein the means for determining the position of the first STA comprises:
means for executing a triangulation positioning operation using at least the first time-of-arrival, the first time-of-departure, the second time-of-arrival, the second time-of-departure, the first sensor data, and the second sensor data.

42. The first STA of claim 37, further comprising:
means for executing a second interrupt routine at a wireless local area network (WLAN) subsystem of the first STA in response to the strobe signal at the first time-of-arrival, wherein execution of the second interrupt routine at the first time-of-arrival includes,
means for obtaining a first timestamp corresponding to the first time-of-arrival, and means for associating the first timestamp with the first sensor data in the one or more shadow registers; and means for executing the second interrupt routine at the WLAN subsystem of the first STA in response to the strobe signal at the first time-of-departure, wherein execution of the second interrupt routine at the first time-of-departure includes, means for obtaining a second timestamp corresponding to the first time-of-departure, and means for associating the second timestamp with the second sensor data in the one or more shadow registers.

43. The first STA of claim 37, further comprising:
means for performing a plurality of activations of the strobe signal to store
a first plurality of sensor data at a corresponding first plurality of times-of-departure of packet transmissions,
a second plurality of sensor data at a corresponding second plurality of times-of-arrival of packet transmissions, or
any combination thereof; and
means for identifying outliers in the first plurality of sensor data, the second plurality of sensor data, or any combination thereof.

44. The first STA of claim 37, wherein:
the first STA is an initiator STA (ISTA).

45. The first STA of claim 37, wherein:
the first STA is a responding STA (RSTA).

46. A first STA, comprising:
means for transmitting a first packet at a first time-of-departure; and
means for generating a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof;
means for executing a first interrupt routine at a sensor subsystem of the first STA in response to the strobe signal at the first time-of-departure, wherein execution of the first interrupt routine at the first time-of-departure includes,
means for obtaining the first sensor data from the one or more sensors, and
means for storing the first sensor data in one or more shadow registers
means for receiving a second packet from a second STA at a first time-of-arrival of the second packet;
means for generating the strobe signal to store second sensor data at the first time-of-arrival, wherein the second sensor data corresponds to the sensor output of the one or more sensors at the first time-of-arrival; and
means for executing a first interrupt routine at a sensor subsystem of the first STA in response to the strobe signal at the first time-of-arrival, wherein execution of the first interrupt routine at the first time-of-arrival includes,
means for obtaining the second sensor data from the one or more sensors, and
means for storing the second sensor data in the one or more shadow registers.

47. The first STA of claim 46, wherein:
the first packet is a null data packet (NDP); and
the second packet is a NDP received from a second STA.

48. The first STA of claim 47, further comprising:
means for receiving a report from the second STA indicating at least a second time-of-arrival at which the first packet was received at the second STA, and a second time-of-departure at which the second packet was transmitted by the second STA.

49. The first STA of claim 48, further comprising:
means for determining a position of the first STA based at least on the first time-of-arrival, the first time-of-departure, the second time-of-arrival, the second time-of-departure, the first sensor data, and the second sensor data.

50. The first STA of claim 49, wherein the means for determining the position of the first STA comprises:
means for executing a triangulation positioning operation using at least the first time-of-arrival, the first time-of-departure, the second time-of-arrival, the second time-of-departure, the first sensor data, and the second sensor data.

51. The first STA of claim 50, further comprising:
means for executing a second interrupt routine at a wireless local area network (WLAN) subsystem of the first STA in response to the strobe signal at the first time-of-arrival, wherein execution of the first interrupt routine at the first time-of-arrival includes,
means for obtaining a first timestamp corresponding to the first time-of-arrival, and
means for associating the first timestamp with the first sensor data in the one or more shadow registers; and
means for executing the second interrupt routine at the WLAN subsystem of the first STA in response to the strobe signal at the first time-of-departure, wherein execution of the first interrupt routine at the first time-of-departure includes,
means for obtaining a second timestamp corresponding to the first time-of-departure, and
means for associating the second timestamp with the second sensor data in the one or more shadow registers.

52. The first STA of claim 46, further comprising:
means for performing a plurality of activations of the strobe signal to store
a first plurality of sensor data at a corresponding first plurality of times-of-departure of packet transmissions,
a second plurality of sensor data at a corresponding second plurality of times-of-arrival of packet transmissions, or
any combination thereof; and
means for identifying outliers in the first plurality of sensor data, the second plurality of sensor data, or any combination thereof.

53. The first STA of claim 46, wherein:
the first STA is an initiator STA (ISTA).

54. The first STA of claim 46, wherein:
the first STA is a responding STA (RSTA).

55. A non-transitory computer-readable medium storing computer-executable instructions that, when executed by a first station (STA), cause the first STA to:
receive a first packet from a second STA at a first time-of-arrival of the first packet; and
generate a strobe signal to store first sensor data at the first time-of-arrival, wherein the first sensor data corresponds to a sensor output of one or more sensors of the first STA at the first time-of-arrival, wherein the one or more sensors include an accelerometer, a gyroscope, a magnetometer, or any combination thereof;
execute a first interrupt routine at a sensor subsystem of the first STA in response to the strobe signal at the first time-of-arrival, wherein execution of the first interrupt routine at the first time-of-arrival includes, obtaining the first sensor data from the one or more sensors, and storing the first sensor data in one or more shadow registers;

transmit, in response to receiving the first packet, a second packet to the second STA at a first time-of-departure of the second packet; and generate the strobe signal to store second sensor data at the first time-of-departure, wherein the second sensor data corresponds to the sensor output of the one or more sensors at the first time-of-departure; and execute the first interrupt routine at the sensor subsystem of the first STA in response to the strobe signal at the first time-of-departure, wherein execution of the first interrupt routine at the first time-of-departure includes, obtaining the second sensor data from the one or more sensors, and storing the second sensor data in the one or more shadow registers.

56. The non-transitory computer-readable medium of claim 55, wherein:

the first packet is a fine time measurement packet; and the second packet is an acknowledgment of the fine time measurement packet.

57. The non-transitory computer-readable medium of claim 56, further comprising computer-executable instructions that, when executed by the first STA, cause the first STA to:

receive a report from the second STA indicating at least a second time-of-departure at which the first packet was transmitted from the second STA, and a second time-of-arrival at which the second packet was received at the second STA.

58. The non-transitory computer-readable medium of claim 57, further comprising computer-executable instructions that, when executed by the first STA, cause the first STA to:

determine a position of the first STA based at least on the first time-of-arrival, the first time-of-departure, the second time-of-arrival, the second time-of-departure, the first sensor data, and the second sensor data.

59. The non-transitory computer-readable medium of claim 58, wherein the computer-executable to determine the position of the first STA comprise computer-executable instructions that, when executed by the first STA, cause the first STA to:

execute a triangulation positioning operation using at least the first time-of-arrival, the first time-of-departure, the second time-of-arrival, the second time-of-departure, the first sensor data, and the second sensor data.

60. The non-transitory computer-readable medium of claim 55, further comprising computer-executable instructions that, when executed by the first STA, cause the first STA to:

execute a second interrupt routine at a wireless local area network (WLAN) subsystem of the first STA in response to the strobe signal at the first time-of-arrival, wherein execution of the second interrupt routine at the first time-of-arrival includes, obtaining a first timestamp corresponding to the first time-of-arrival, and associating the first timestamp with the first sensor data in the one or more shadow registers; and execute the second interrupt routine at the WLAN subsystem of the first STA in response to the strobe signal at the first time-of-departure, wherein execution of the second interrupt routine at the first time-of-departure includes, obtaining a second timestamp corresponding to the first time-of-departure, and associating the second timestamp with the second sensor data in the one or more shadow registers.

61. The non-transitory computer-readable medium of claim 55, further comprising computer-executable instructions that, when executed by the first STA, cause the first STA to:

perform a plurality of activations of the strobe signal to store a first plurality of sensor data at a corresponding first plurality of times-of-departure of packet transmissions, a second plurality of sensor data at a corresponding second plurality of times-of-arrival of packet transmissions, or any combination thereof; and identify outliers in the first plurality of sensor data, the second plurality of sensor data, or any combination thereof.

62. The non-transitory computer-readable medium of claim 55, wherein:

the first STA is an initiator STA (ISTA).

63. The non-transitory computer-readable medium of claim 55, wherein:

the first STA is a responding STA (RSTA).

64. A non-transitory computer-readable medium storing computer-executable instructions that, when executed by a first STA, cause the first STA to:

transmit a first packet at a first time-of-departure; and generate a strobe signal to store first sensor data at the first time-of-departure, wherein the first sensor data corresponds to a sensor output of one or more sensors of the first STA at the first time-of-departure, and wherein the one or more sensors include an accelerometer, a gyroscope, a magnetometer, or any combination thereof;

execute a first interrupt routine at a sensor subsystem of the first STA in response to the strobe signal at the first time-of-departure, wherein execution of the first interrupt routine at the first time-of-departure includes, obtaining the first sensor data from the one or more sensors, and storing the first sensor data in one or more shadow registers;

receive a second packet from a second STA at a first time-of-arrival of the second packet;

generate the strobe signal to store second sensor data at the first time-of-arrival, wherein the second sensor data corresponds to the sensor output of the one or more sensors at the first time-of-arrival; and execute the first interrupt routine at the sensor subsystem of the first STA in response to the strobe signal at the first time-of-arrival, wherein execution of the first interrupt routine at the first time-of-arrival includes, obtaining the first sensor data from the one or more sensors, and storing the first sensor data in the one or more shadow registers.

65. The non-transitory computer-readable medium of claim 64, wherein:

the first packet is a null data packet (NDP); and the second packet is a NDP received from a second STA.

66. The non-transitory computer-readable medium of claim 65, further comprising computer-executable instructions that, when executed by the first STA, cause the first STA to:

receive a report from the second STA indicating at least a second time-of-arrival at which the first packet was received at the second STA, and a second time-of-departure at which the second packet was transmitted by the second STA.

67. The non-transitory computer-readable medium of claim 66, further comprising computer-executable instructions that, when executed by the first STA, cause the first STA to:

determine a position of the first STA based at least on the first time-of-arrival, the first time-of-departure, the second time-of-arrival, the second time-of-departure, the first sensor data, and the second sensor data.

68. The non-transitory computer-readable medium of claim 67, wherein the computer-executable instructions to determine the position of the first STA comprise computer-executable instructions that, when executed by the first STA, cause the first STA to:

execute a triangulation positioning operation using at least the first time-of-arrival, the first time-of-departure, the second time-of-arrival, the second time-of-departure, the first sensor data, and the second sensor data.

69. The non-transitory computer-readable medium of claim 64, further comprising computer-executable instructions that, when executed by the first STA, cause the first STA to:

execute a second interrupt routine at a wireless local area network (WLAN) subsystem of the first STA in response to the strobe signal at the first time-of-arrival, wherein execution of the first interrupt routine at the first time-of-arrival includes, obtaining a first timestamp corresponding to the first time-of-arrival, and associating the first timestamp with the first sensor data in the one or more shadow registers; and execute the second interrupt routine at the WLAN subsystem of the first STA in response to the strobe signal at the first time-of-departure, wherein execution of the first interrupt routine at the first time-of-departure includes, obtaining a second timestamp corresponding to the first time-of-departure, and associating the second timestamp with the second sensor data in the one or more shadow registers.

70. The non-transitory computer-readable medium of claim 64, further comprising computer-executable instructions that, when executed by the first STA, cause the first STA to:

perform a plurality of activations of the strobe signal to store a first plurality of sensor data at a corresponding first plurality of times-of-departure of packet transmissions, a second plurality of sensor data at a corresponding second plurality of times-of-arrival of packet transmissions, or any combination thereof; and identify outliers in the first plurality of sensor data, the second plurality of sensor data, or any combination thereof.

71. The non-transitory computer-readable medium of claim 64, wherein:

the first STA is an initiator STA (ISTA).

72. The non-transitory computer-readable medium of claim 64, wherein:

the first STA is a responding STA (RSTA).

* * * * *